United States Patent
Suzuki et al.

(10) Patent No.: US 10,731,532 B2
(45) Date of Patent: *Aug. 4, 2020

(54) EXHAUST GAS PURIFICATION CATALYST

(71) Applicants: TOYOTA JIDOSHA KABUSHIKI KAISHA, Toyota-shi, Aichi-ken (JP); CATALER CORPORATION, Kakegawa-shi, Shizuoka-ken (JP)

(72) Inventors: Hiromasa Suzuki, Toyota (JP); Masahide Miura, Toyota (JP); Yoshinori Saito, Kakegawa (JP); Satoru Katoh, Nagakute (JP); Toshitaka Tanabe, Nagakute (JP); Tetsuhiro Hirao, Toyota (JP); Tatsuya Ohashi, Kakegawa (JP); Hiroaki Naito, Kikugawa (JP); Hirotaka Ori, Kakegawa (JP); Michihiko Takeuchi, Kakegawa (JP); Keiichi Narita, Kakegawa (JP)

(73) Assignees: TOYOTA JIDOSHA KABUSHIKI KAISHA, Toyota-shi, Aichi-ken (JP); CATALER CORPORATION, Kakegawa-shi, Shizuoka (JP)

( * ) Notice: Subject to any disclaimer, the term of this patent is extended or adjusted under 35 U.S.C. 154(b) by 153 days.

This patent is subject to a terminal disclaimer.

(21) Appl. No.: 15/561,738

(22) PCT Filed: Mar. 24, 2016

(86) PCT No.: PCT/JP2016/059305
§ 371 (c)(1),
(2) Date: Sep. 26, 2017

(87) PCT Pub. No.: WO2016/158638
PCT Pub. Date: Oct. 6, 2016

(65) Prior Publication Data
US 2018/0106175 A1    Apr. 19, 2018

(30) Foreign Application Priority Data

Mar. 27, 2015  (JP) .................. 2015-065620

(51) Int. Cl.
*F01N 3/28*     (2006.01)
*F01N 3/00*     (2006.01)
(Continued)

(52) U.S. Cl.
CPC ........... *F01N 3/101* (2013.01); *B01D 53/865* (2013.01); *B01D 53/94* (2013.01); *B01D 53/945* (2013.01);
(Continued)

(58) Field of Classification Search
CPC ........ B01D 2255/10; B01D 2255/9022; B01D 2255/9202; B01D 2255/9205;
(Continued)

(56) References Cited

U.S. PATENT DOCUMENTS 4,859,433 A    8/1989 Pereira et al.
7,276,212 B2   10/2007 Hu et al.
(Continued)

FOREIGN PATENT DOCUMENTS

EP    0 945 167 A2    9/1999
EP    2 168 662 A1    3/2010
(Continued)

OTHER PUBLICATIONS

Notice of Allowance dated Aug. 10, 2018 from the United States Patent and Trademark Office in U.S. Appl. No. 15/553,020.
(Continued)

*Primary Examiner* — Phutthiwat Wongwian
*Assistant Examiner* — Diem T Tran
(74) *Attorney, Agent, or Firm* — Sughrue Mion, PLLC

(57) ABSTRACT

The problem of the present invention is to provide an exhaust gas purification catalyst which can exhibit sufficient
(Continued)

purification performance under a high Ga condition while having a resistance to stress such as high-temperature and poisonous substances. The present invention relates to an exhaust gas purification catalyst comprising two or more catalyst coating layers on a substrate, wherein a lower catalyst coating layer that is present lower with respect to an uppermost catalyst coating layer has a structure where a large number of voids are included and high-aspect-ratio pores having an aspect ratio of 5 or more account for a certain proportion or more of the whole volume of voids, thereby to improve gas diffusivity in the lower catalyst coating layer.

12 Claims, 17 Drawing Sheets

(51) Int. Cl.

| | | |
|---|---|---|
| *B01J 35/10* | (2006.01) | |
| *B01J 37/02* | (2006.01) | |
| *B01J 23/63* | (2006.01) | |
| *F01N 3/10* | (2006.01) | |
| *B01D 53/94* | (2006.01) | |
| *B01J 37/00* | (2006.01) | |
| *B01D 53/86* | (2006.01) | |
| *B01J 23/56* | (2006.01) | |
| *B01J 37/04* | (2006.01) | |
| *B01J 37/08* | (2006.01) | |
| *B01J 35/02* | (2006.01) | |

(52) U.S. Cl.
CPC .............. *B01J 23/56* (2013.01); *B01J 23/63* (2013.01); *B01J 35/10* (2013.01); *B01J 35/108* (2013.01); *B01J 35/1076* (2013.01); *B01J 37/0018* (2013.01); *B01J 37/0219* (2013.01); *B01J 37/0244* (2013.01); *B01J 37/04* (2013.01); *F01N 3/28* (2013.01); *B01D 2255/10* (2013.01); *B01D 2255/9022* (2013.01); *B01D 2255/9202* (2013.01); *B01D 2255/9205* (2013.01); *B01J 35/023* (2013.01); *B01J 35/026* (2013.01); *B01J 37/0036* (2013.01); *B01J 37/0234* (2013.01); *B01J 37/08* (2013.01); *Y02T 10/22* (2013.01)

(58) Field of Classification Search
CPC .... B01D 53/865; B01D 53/94; B01D 53/945; B01J 23/56; B01J 23/63; B01J 35/023; B01J 35/026; B01J 35/10; B01J 35/1076; B01J 35/108; B01J 37/0018; B01J 37/0036; B01J 37/0219; B01J 37/0234; B01J 37/0244; B01J 37/04; B01J 37/08; F01N 3/101; F01N 3/28; Y02T 10/22
See application file for complete search history.

(56) References Cited

U.S. PATENT DOCUMENTS

| | | | |
|---|---|---|---|
| 8,062,603 B2 | 11/2011 | Komori et al. | |
| 8,293,182 B2* | 10/2012 | Boorse | B01D 53/9468 422/180 |
| 8,470,254 B2 | 6/2013 | Mizutani et al. | |
| 9,347,354 B2 | 5/2016 | Pfeifer et al. | |
| 9,511,352 B2 | 12/2016 | Qi et al. | |
| 9,687,785 B2 | 6/2017 | Chen et al. | |
| 9,687,786 B2 | 6/2017 | Chen et al. | |
| 9,789,441 B2 | 10/2017 | Larsson et al. | |
| 9,873,085 B2* | 1/2018 | Yoshida | B01J 23/42 |
| 10,071,342 B2* | 9/2018 | Schoenhaber | B01D 53/94 |
| 2001/0051590 A1 | 12/2001 | Noda et al. | |
| 2008/0226514 A1 | 9/2008 | Chen et al. | |
| 2010/0101212 A1 | 4/2010 | Iwachido et al. | |
| 2011/0271664 A1* | 11/2011 | Boorse | B01D 53/9468 60/301 |
| 2018/0071680 A1 | 3/2018 | Suzuki et al. | |
| 2018/0104679 A1 | 4/2018 | Suzuki et al. | |
| 2018/0106174 A1 | 4/2018 | Suzuki et al. | |
| 2018/0252132 A1 | 9/2018 | Suzuki et al. | |

FOREIGN PATENT DOCUMENTS

| | | |
|---|---|---|
| EP | 3 045 227 A1 | 7/2016 |
| EP | 3 263 214 A1 | 1/2018 |
| JP | S63-205143 A | 8/1988 |
| JP | 63-287558 A | 11/1988 |
| JP | 2004-330025 A | 11/2004 |
| JP | 2009-000663 A | 1/2009 |
| JP | 2010-082615 A | 4/2010 |
| JP | 2010-104897 A | 5/2010 |
| JP | 2012-240027 A | 12/2012 |
| JP | 2016-182585 A | 10/2016 |
| JP | 2016-182586 A | 10/2016 |
| JP | 2016-185492 A | 10/2016 |
| JP | 2016-185493 A | 10/2016 |
| JP | 2016-185495 A | 10/2016 |
| JP | 2016-185497 A | 10/2016 |
| WO | 2015/037613 A1 | 3/2015 |

OTHER PUBLICATIONS

Non-Final Office Action dated Dec. 31, 2018 from the United States Patent and Trademark Office in U.S. Appl. No. 15/560,706.
Notice of Allowance dated Feb. 21, 2019 from the United States Patent and Trademark Office in U.S. Appl. No. 15/560,703.
Notice of Allowance dated Oct. 11, 2018 from the United States Patent and Trademark Office in U.S. Appl. No. 15/560,703.
Non-Final Office Action dated Oct. 4, 2018 from the United States Patent and Trademark Office in U.S. Appl. No. 15/560,625.
Non-Final Office Action dated Jan. 10, 2019 from the United States Patent and Trademark Office in U.S. Appl. No. 15/561,656.
U.S. Appl. No. 15/560,703, Suzuki et al., filed Sep. 22, 2017.
U.S. Appl. No. 15/560,706, Suzuki et al., filed Sep. 22, 2017.
Notice of Allowance dated Oct. 11, 2018, issued by the United States Patent and Trademark Office in U.S. Appl. No. 15/560,703.
Notice of Allowance dated Feb. 21, 2019, issued by the United States Patent and Trademark Office in U.S. Appl. No. 15/560,703.
Non-Final Office Action dated Dec. 31, 2018, issued by the United States Patent and Trademark Office in U.S. Appl. No. 15/560,706.
Final Office Action dated Mar. 22, 2019, issued by the United States Patent and Trademark Office in U.S. Appl. No. 15/560,706.
Notice of Allowance dated Jun. 17, 2019, issued by the United States Patent and Trademark Office in U.S. Appl. No. 15/560,706.

* cited by examiner

EXHAUST GAS PURIFICATION CATALYST

CROSS REFERENCE TO RELATED APPLICATIONS

This application is a National Stage of International Application No. PCT/JP2016/059305, filed on Mar. 24, 2016, which claims priority from Japanese Patent Application No. 2015-065620, filed on Mar. 27, 2015, the contents of all of which are incorporated herein by reference in their entirety.

TECHNICAL FIELD

The present invention relates to an exhaust gas purification catalyst. More specifically, it relates to an exhaust gas purification catalyst comprising two or more catalyst coating layers, wherein a lower catalyst coating layer that is present lower with respect to an uppermost catalyst coating layer has a high-aspect-ratio pore at a certain rate.

BACKGROUND ART

Exhaust gas discharged from an internal combustion engine of an automotive or the like includes harmful gases such as carbon monoxide (CO), nitrogen oxides (NOx), and unburned hydrocarbon (HC). An exhaust gas purification catalyst for decomposition of such harmful gases is also referred to as a "three-way catalyst", and commonly has a honeycomb-shaped monolith substrate made of cordierite or the like and a catalyst coating layer formed thereon by wash coating of a slurry including a noble metal particle having catalyst activity and an auxiliary catalyst having oxygen storage capacity (OSC).

Various approaches have been made in order to enhance purification efficiency of the exhaust gas purification catalyst. There is known, for example, a procedure where a void is formed in a catalyst coating layer in order to enhance diffusivity of exhaust gas in the catalyst coating layer. For example, known methods for forming a void in a catalyst coating layer involve increasing the particle size of a catalyst particle, or use of a pore-forming material which disappears in firing of a catalyst at the final stage of production to provide a void. For example, Patent Literature 1 describes a method where a void is provided by adding magnesia having a particle size of 0.1 to 3.0 μm to form a catalyst layer.

If a void is provided in a catalyst layer, however, the thickness of the catalyst layer is increased due to the void, and therefore the pressure loss of the catalyst may be increased to cause engine output power and/or fuel efficiency to be lowered. In addition, the void provided by any of the above methods has the following problem, for example: the strength of the catalyst layer is decreased, or a sufficient effect is not obtained because of poor void linkage. In view of such a problem, for example, Patent Literature 2 describes a method where a carbon compound material having a predetermined shape is mixed and is allowed to disappear in catalyst firing to thereby provide a void in a catalyst layer, the void having a mode in the frequency distribution with respect to the depth to length ratio (D/L) in the cross section of 2 or more.

CITATION LIST

Patent Literature

Patent Literature 1: JP Patent Publication (Kokai) No. 2010-104897 A

Patent Literature 2: JP Patent Publication (Kokai) No. 2012-240027 A

SUMMARY OF INVENTION

Technical Problem

In view of the problematic reduction in catalyst activity in a catalyst using two noble metals such as Pt and Rh due to formation of a solid solution of noble metals, there is known a two-layer catalyst in which such two noble metals are contained in respective different layers. In such a two-layer catalyst, an upper layer in direct contact with exhaust gas is highly exposed to high stress, namely, high-temperature and high-concentration gas, and poisonous substances such as sulfur (S) and hydrocarbon (HC). Therefore, in order to provide a catalyst having sufficient resistance thereto, it is required to dispose a noble metal (for example, Rh) having relatively high resistance to poison in an upper layer and a noble metal (for example, Pd) having a relatively low resistance to poison in a lower layer, and to increase an amount of a catalyst coating in an upper layer.

However, if the amount of coating is increased, a problem is that the gas diffusivity in the catalyst coating layer and also the use efficiency of a catalytic active site are reduced to thereby reduce purification performance. In particular, the purification performance of the catalyst is gas diffusion rate-controlled under a condition of a high intake air mass in acceleration or the like (a condition of a high intake air mass or a high Ga condition: being the same as a high space velocity or high SV condition), and therefore such a problem is particularly caused under such a condition. Particularly, in a lower layer into which a low-concentration gas purified in an upper layer flows, the thicker the upper layer becomes, the less the poisonous substance reaches, and the resistance to poison improves. On the other hand, under a high Ga condition, the gas hardly reaches the lower layer, and the purification performance deteriorates as the use efficiency of the active site decreases. It has been expected that the purification performance of the lower layer can be improved while maintaining the resistance to poison by improving the gas diffusivity in the lower layer. However, there has not been found, any method for forming a catalyst coating which achieves sufficient gas diffusivity under a high Ga condition.

Solution to Problem

The present inventors have made studies to solve the above problems, and as a result, have found that when an organic fiber having a predetermined shape is used as a pore-forming material, a catalyst coating which has a high-aspect-ratio pore excellent in gas communicability and is excellent in gas diffusivity can be formed. The present inventors have then found that such a catalyst coating is used as a lower layer of a multi-layer catalyst having two or more catalyst coating layers, thereby resulting in an increase in purification performance under a high Ga condition, with resistance to poison under a rich (high HC) condition or under a high S condition being kept. The gist of the present invention is as follows.

(1) An exhaust gas purification catalyst comprising two or more catalyst coating layers on a substrate, wherein:
each catalyst coating layer comprises a catalyst particle having a different composition from that of an adjacent catalyst coating layer:
in a lower catalyst coating layer that is present lower with respect to an uppermost catalyst coating layer, an average thickness of the coating layer is in a range from 25 µm to 160 µm.

a porosity measured by a weight-in-water method is in a range from 50 to 80% by volume, and high-aspect-ratio pores having an aspect ratio of 5 or more account for 0.5 to 50% by volume of the whole volume of voids, and the high-aspect-ratio pore has an equivalent circle diameter of from 2 to 50 µm in a cross-sectional image of a catalyst coating layer cross section perpendicular to an exhaust gas flow direction and has an average aspect ratio of from 10 to 50.

(2) The exhaust gas purification catalyst according to (1), wherein in the lower catalyst coating layer, the high-aspect-ratio pore is oriented such that an 80% cumulative angle, in a cumulative angle distribution on an angle basis, of an angle (cone angle) between a vector in a longitudinal direction of the high-aspect-ratio pore and a vector in an exhaust gas flow direction of the substrate is in a range from 0 to 45 degrees.

(3) The exhaust gas purification catalyst according to (1) or (2), wherein a 15% cumulative size, in a cumulative particle size distribution on a cross-sectional area basis, of the catalyst particle contained in the lower catalyst coating layer is in a range from 3 to 10 µm.

(4) The exhaust gas purification catalyst according to any of (1) to (3), wherein in the lower catalyst coating layer, an amount of coating is in a range from 50 to 300 g per liter of the volume of the substrate.

(5) A method for producing an exhaust gas purification catalyst comprising two or more catalyst coating layers on a substrate, the method comprising the step of forming a lower catalyst coating layer that is present lower with respect to an uppermost catalyst coating layer using a catalyst slurry, wherein the catalyst slurry comprises:

a noble metal particle having catalyst activity, a metal oxide particle having a 50% cumulative size of 3 to 10 µm in a cumulative particle size distribution on a volume basis, and a fibrous organic substance in an amount of 0.5 to 9.0 parts by mass based on 100 parts by mass of the metal oxide particle, and the fibrous organic substance has an average fiber diameter in a range from 1.7 to 8.0 µm and an average aspect ratio in a range from 9 to 40.

(6) The method according to (5), comprising the step of forming a catalyst coating by coating a surface of the substrate with the catalyst slurry such that an amount of coating of the catalyst coating layer after firing is in a range from 50 to 300 g per liter of the volume of the substrate and that an average thickness of the catalyst coating layer after firing is in a range from 25 µm to 160 µm.

(7) The method according to (5) or (6), comprising the step of removing at least a part of the fibrous organic substance by firing, after coating the surface of the substrate with the catalyst slurry.

Advantageous Effects of Invention

In the exhaust gas purification catalyst of the present invention, a catalyst coating layer that is present lower with respect to an uppermost catalyst coating layer in the two or more catalyst coating layers has the structure of high gas diffusivity, thereby to exhibit sufficient purification performance under a high Ga condition while having a resistance to stress such as high-temperature and poisonous substances.

The present application claims a priority to Japanese Patent Application No. 2015-065620, the contents described in the description, claims and drawings of which are incorporated herein.

BRIEF DESCRIPTION OF DRAWINGS

FIG. 1(A) is a schematic diagram illustrating a part of a catalyst coating layer cross section perpendicular to an exhaust gas flow direction on the substrate of the exhaust gas purification catalyst of the present invention, FIG. 1(B) is a schematic diagram illustrating a test piece obtained by cutting the exhaust gas purification catalyst in an axial direction at the position of a dotted line illustrated in FIG. 1(A), and FIG. 1(C) schematically represents an SEM image obtained by a FIB-SEM measurement method.

DESCRIPTION OF EMBODIMENTS

[Exhaust Gas Purification Catalyst]

Figure 1:
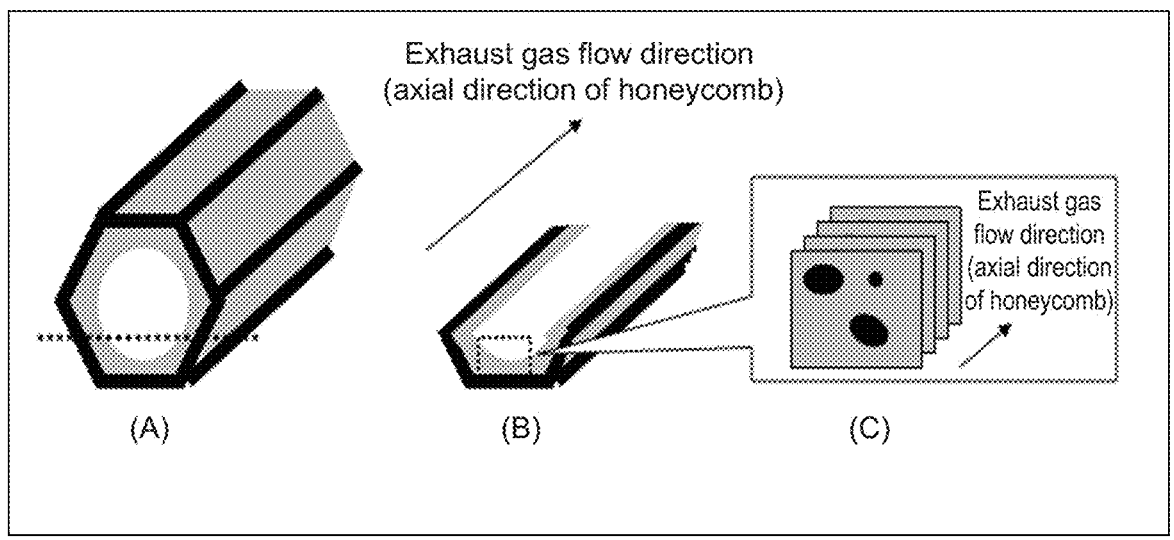
FIG. 1 includes schematic diagrams illustrating one example of a FIB-SEM measurement method.

The exhaust gas purification catalyst of the present invention comprises two or more catalyst coating layers on a substrate, and each catalyst coating layer comprises a catalyst particle having a different composition from that of an adjacent catalyst coating layer. In a lower catalyst coating layer that is present lower with respect to an uppermost catalyst coating layer, an average thickness of the coating layer is in the range from 25 μm to 160 μm, a porosity measured by a weight-in-water method is in the range from 50 to 80% by volume, and high-aspect-ratio pores having an aspect ratio of 5 or more account for 0.5 to 50% by volume of the whole volume of voids. The high-aspect-ratio pore has an equivalent circle diameter of from 2 to 50 μm in a cross-sectional image of a catalyst coating layer cross section perpendicular to an exhaust gas flow direction, and has an average aspect ratio of from 10 to 50.

(Substrate)

A known substrate having a honeycomb shape can be used as the substrate of the exhaust gas purification catalyst of the present invention, and a honeycomb-shaped monolith substrate (honeycomb filter, high-density honeycomb or the like) or the like is specifically suitably adopted. The material of such a substrate is also not particularly limited, and a substrate made of ceramics such as cordierite, silicon carbide, silica, alumina, and mullite, or a substrate made of a metal such as stainless steel including chromium and aluminum is suitably adopted. Among them, cordierite is preferable in terms of cost.

(Catalyst Coating Layer)

The catalyst coating layers in the exhaust gas purification catalyst of the present invention are formed on a surface of the substrate, and configured from two or more, namely, two, three, or four or more layers. Preferably, the catalyst coating layer in the exhaust gas purification catalyst of the present invention has two-layer structure. Each catalyst coating layer has a different composition from that of an adjacent catalyst coating layer. Furthermore, each catalyst coating layer may not be necessarily uniform over the entire substrate of the exhaust gas purification catalyst, and may have a different composition with respect to each section of the substrate, for example, with respect to each of an upstream zone and a downstream zone in an exhaust gas flow direction. Herein, the different composition means that each component forming a catalyst particle described below is different, for example. The two or more catalyst coating layers can be divided to the uppermost catalyst coating layer, and the lower catalyst coating layer(s) that is present lower with respect to the uppermost catalyst coating layer, and at least one layer of the lower catalyst coating layers has a structure where a large number of voids are included as described below. For example, if the catalyst coating layers are configured from three layers, only one intermediate layer or only one lowermost layer may have the structure where a large number of voids are included, or both of these two layers may have the structure where a large number of voids are included. Herein, the "lower catalyst coating layer" referred to hereafter in the present specification means, unless otherwise specified, the catalyst coating layer having the structure where a large number of voids are included as described below in the catalyst coating layers located lower with respect to the uppermost catalyst coating layer.

Each catalyst coating layer includes a catalyst particle formed from a noble metal serving as a main catalyst, a metal oxide, and the like. Specific examples of the metal oxide forming the catalyst particle include aluminum oxide ($Al_2O_3$, alumina), cerium oxide ($CeO_2$, ceria), zirconium oxide ($ZrO_2$, zirconia), silicon oxide ($SiO_2$, silica), yttrium oxide ($Y_2O_3$, yttria) and neodymium oxide ($Nd_2O_3$), as well as composite oxides thereof. Such metal oxides may be used in combinations of two or more.

Specific examples of the noble metal forming the catalyst particle include platinum (Pt), palladium (Pd), rhodium (Rh), gold (Au), silver (Ag), iridium (Ir) and ruthenium (Ru). Among them, at least one selected from the group consisting of Pt, Rh, Pd, Ir and Ru is preferable, and at least one selected from the group consisting of Pt, Rh and Pd is particularly preferable in terms of catalyst performance. It is preferable that one noble metal be used per catalyst coating layer.

The noble metal is preferably supported on the metal oxide described above. The amount of the noble metal to be supported is not particularly limited, and an appropriate amount thereof may be supported depending on the intended design and the like. The content of the noble metal is preferably 0.01 to 10 parts by mass, more preferably 0.01 to 5 parts by mass, in terms of metal, based on 100 parts by mass of the catalyst particle. While too small an amount of the noble metal supported tends to result in an insufficient catalyst activity, and on the other hand, too large an amount thereof tends to cause saturation of catalyst activity and an increase in cost. Any amount in the above preferred range does not cause such problems.

The uppermost catalyst coating layer in the two or more catalyst coating layers formed on the substrate is highly exposed to high stress, namely, high-temperature and high-concentration gas, and poisonous substances such as sulfur (S) and hydrocarbon (HC), as compared with the lower catalyst coating layer(s). Therefore, in order to provide a catalyst having durability thereto, a noble metal whose catalyst activity is hardly impaired by stress or poisonous substances is preferably used in the uppermost catalyst coating layer. Examples of such a noble metal include Rh. In addition, examples of a noble metal which is relatively poor resistance to stress and poisonous substances and preferably used in any other than the uppermost catalyst coating layer include Pd and Pt.

The amount of coating of one layer of the catalyst coating layer is preferably in the range from 50 to 300 g per liter of the volume of the substrate. Too small an amount of coating does not impart sufficient catalyst activity performance of the catalyst particle and thus does not impart sufficient catalyst performance such as NOx purification performance. On the other hand, too large an amount thereof also increases pressure loss to cause fuel efficiency to be deteriorated. Any amount in the above preferred range does not cause such problems. Herein, the amount of coating of one layer of the catalyst coating layer is more preferably in the range from 50 to 250 g, particularly from 50 to 200 g, per liter of the volume of the substrate, in terms of a balance among pressure loss, catalyst performance and durability.

The thickness of one layer of the catalyst coating layer is preferably in the range from 25 μm to 160 μm as the average thickness. Too thin a catalyst coating layer does not impart sufficient catalyst performance. On the other hand, too thick a catalyst coating layer increases the pressure loss in passing of exhaust gas and the like to fail to impart sufficient catalyst performance such as NOx purification performance. Any thickness in the above preferred range does not cause such problems. Herein, the thickness is more preferably in the range from 30 to 96 μm, particularly from 32 to 92 μm, in terms of a balance among pressure loss, catalyst performance and durability. The "thickness" of the catalyst coating layer used herein means a length of the catalyst coating layer in a direction perpendicular to the center of a flat portion of the substrate, namely, the shortest distance between the surface of the catalyst coating layer and the surface of the substrate (an interface with the lower layer catalyst coating when the lower layer catalyst coating is present). The average thickness of the catalyst coating layer can be determined by, for example, observing the catalyst coating layer with a scanning electron microscope (SEM) or an optical microscope to measure the thickness at each of any 10 points or more, and calculating the average thickness.

A 15% cumulative size (D15), in a cumulative particle size distribution on a cross-sectional area basis, of the catalyst particle contained in the catalyst coating layer is preferably 3 to 10 μm, at least with respect to the lower catalyst coating layer. Too small a size of the catalyst particle causes a low porosity and a low gas diffusivity and thus does not impart sufficient catalyst performance such as NOx purification performance. On the other hand, too large a size thereof causes a high gas diffusion resistance in the catalyst coating layer and thus does not impart sufficient catalyst performance such as NOx purification performance. Any particle size in the above preferred range does not cause such problems. Herein, the 15% cumulative size, in a cumulative particle size distribution on a cross-sectional area basis, is more preferably in the range from 3 to 9 μm, particularly 3 to 7 μm, in terms of a balance with gas diffusion resistance in the catalyst coating layer and ensuring of coatability with a slurry.

The 15% cumulative size (D15) of the catalyst particle can be determined by, for example, SEM observation of the cross section of the catalyst coating layer. Specifically, an exemplary procedure is as follows: the exhaust gas purification catalyst is embedded with an epoxy resin or the like; SEM observation (magnification: 700 to 1500-fold, pixel resolution: 0.2 μm/pixel or more) of a cross-section cut in a radial direction of the substrate is performed; and the 15% cumulative size, in a cumulative particle size distribution on a cross-sectional area basis, of the catalyst particle is calculated. Herein, the 15% cumulative size of the catalyst particle (hereinafter, sometimes designated as "D15") means a particle size of the catalyst particle which corresponds to the particle size at 15% in terms of frequency (a cumulative frequency of 15% on an area basis) relative to the whole of the cross-sectional area of the catalyst coating layer when the catalyst particle size (cross-sectional area) is cumulated from the largest cross-sectional area of the catalyst particle in the descending order, provided that any pore where the sum of the cross-sectional area of the catalyst particle is less than 0.3 μm² is excluded for the purpose of distinguishing from noise. Such observation is preferably performed on a square region of 200 μm or more in a horizontal direction to a substrate flat portion of the catalyst coating layer and 25 μm or more in a perpendicular direction to the substrate flat portion. Herein, the particle size refers to a diameter of a minimum circumscribed circle if the cross section is not circular.

While the catalyst coating layer is formed mainly from the catalyst particle, the catalyst coating layer may also further comprise other component as long as the effect of the present invention is not impaired. Examples of such other component include other metal oxide and an additive for use in a catalyst coating layer in such a kind of use, and specific examples include one or more of alkali metals such as potassium (K), sodium (Na), lithium (Li) and cesium (Cs), alkaline earth metals such as barium (Ba), calcium (Ca) and strontium (Sr), rare-earth elements such as lanthanum (La), yttrium (Y) and cerium (Ce), and transition metals such as iron (Fe).

(Lower Catalyst Coating Layer)

A large number of voids are included in the lower catalyst coating layer that is present lower with respect to an uppermost catalyst coating layer, and the porosity thereof is preferably in the range from 50 to 80% by volume as measured by a weight-in-water method. Too low a porosity of the lower catalyst coating layer deteriorates gas diffusivity and thus does not impart sufficient catalyst performance. On the other hand, too high a porosity increases diffusivity to thereby increase a proportion of gas passing through the coating layer without coming in contact with a catalytic active site, not imparting sufficient catalyst performance. Any porosity in the above preferred range does not cause such problems. The porosity of the lower catalyst coating layer is more preferably in the range from 50.9 to 78.8% by volume, particularly from 54 to 78.0% by volume, in terms of a balance between gas diffusivity and catalyst performance.

The "void(s)" in the lower catalyst coating layer means a space in the catalyst coating layer. The shape of the "void" is not particularly limited, and for example, may be any of spherical, elliptical, cylindrical, cuboid (rectangular column), disc, through-hole shapes, and shapes similar thereto. Such a void encompasses pores such as a micropore having an equivalent circle diameter of a cross-section, of less than 2 μm; a high-aspect-ratio pore having an equivalent circle diameter of a cross-section, of 2 μm or more, and having an aspect ratio of 5 or more; and a pore having an equivalent circle diameter of a cross-section, of 2 μm or more, and not having an aspect ratio of 5 or more. The porosity of the lower catalyst coating layer can be determined by, for example, subjecting an exhaust gas purification catalyst with only an lower catalyst coating layer to measurement by a weight-in-water method. Specifically, the porosity can be measured by, for example, a method according to a method prescribed in JIS R 2205.

In the exhaust gas purification catalyst of the present invention, high-aspect-ratio pores having an aspect ratio of 5 or more account for 0.5 to 50% by volume of the whole volume of voids in the lower catalyst coating layer. The high-aspect-ratio pore is characterized by having an equivalent circle diameter of from 2 to 50 μm in a cross-sectional image of a catalyst coating layer cross section perpendicular to an exhaust gas flow direction, and an average aspect ratio of from 10 to 50. Accordingly, a pore having an equivalent circle diameter of less than 2 μm is not considered to be a high-aspect-ratio pore, even if having an aspect ratio of 5 or more.

Too low an average aspect ratio of the high-aspect-ratio pore does not impart sufficient pore connectivity. On the other hand, too high an average aspect ratio thereof causes too high a gas diffusivity and thus increases a proportion of gas passing through the coating layer without coming into contact with a catalytic active site, not imparting sufficient catalyst performance. Any average aspect ratio in the range from 10 to 50 does not cause such problems. The average aspect ratio of the high-aspect-ratio pore is more preferably in the range from 10 to 35, particularly in the range from 10 to 30, in view of compatibility of gas diffusivity with catalyst performance.

The average aspect ratio of the high-aspect-ratio pore in the lower catalyst coating layer can be measured by analyzing a cross-sectional image of a catalyst coating layer cross section perpendicular to an exhaust gas flow direction (axial direction of a honeycomb-shaped substrate) of the substrate, from the three-dimensional information on the pore of the catalyst coating layer, obtained by FIB-SEM (Focused Ion Beam-Scanning Electron Microscope), X-ray CT, or the like.

Figure 4:
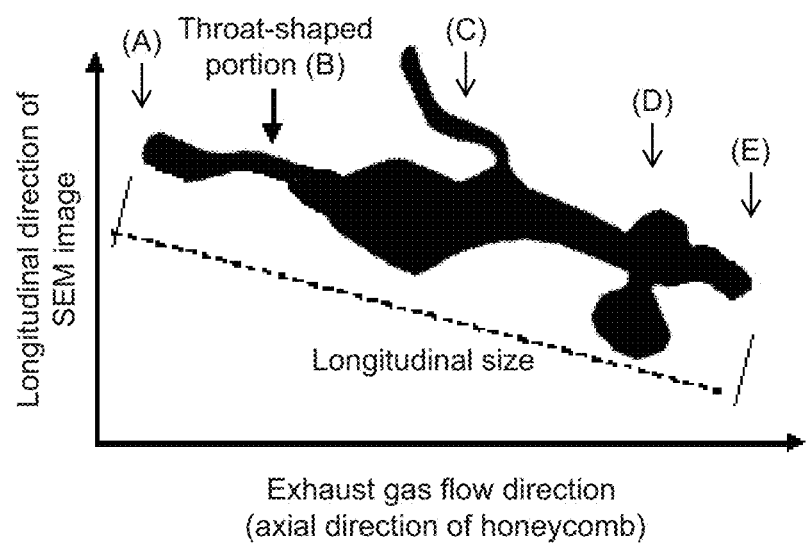
FIG. 4 is a two-dimensional projection diagram exemplifying three-dimensional information on a pore, obtained by analyzing a continuous cross-sectional image of a catalyst coating layer cross section perpendicular to an exhaust gas flow direction of the substrate of the exhaust gas purification catalyst of the present invention.

Specifically, for example, in the case of FIB-SEM analysis, first, a continuous cross-sectional image (SEM image) of a catalyst coating layer cross section perpendicular to an exhaust gas flow direction of the substrate is acquired by FIB-SEM analysis. Next, the resulting continuous cross-sectional image is analyzed, and three-dimensional information on a pore having an equivalent circle diameter of a cross-section, of 2 μm or more, is extracted. FIG. 4 illustrates a two-dimensional projection diagram exemplifying analysis results of three-dimensional information on the pore, obtained by analyzing a continuous cross-sectional image of a catalyst coating layer cross section perpendicular to an exhaust gas flow direction of the substrate of the exhaust gas purification catalyst, as one example of analysis results of three-dimensional information on the pore. As is clear from the analysis results of three-dimensional information on the pore shown in FIG. 4, the shape of the pore is indefinite, and a distance for connecting a starting point and an end point in the continuous cross-sectional image (SEM image) of the pore is defined as "longitudinal size". Herein, the starting point and the end point correspond to centroids in each SEM image. Next, a constriction portion in a path for connecting the starting point and the end point at the shortest distance in the continuous cross-sectional image (SEM image) of the pore is defined. The minimum part whose equivalent circle diameter is 2 μm or more and is also minimum among the constriction portions in the cross-sectional SEM image is defined as a "throat-shaped portion," and the equivalent circle diameter thereof in the cross-sectional SEM image is defined as a "throat-shaped portion size". (while a plurality of constriction portions may be present in a pore, the throat-shaped portion size for calculating the aspect ratio is defined as follows: the minimum constriction portion is selected in the path for connecting the starting point and the end point at the shortest distance, and the equivalent circle diameter of the pore in the cross-sectional SEM image of the minimum constriction portion (throat-shaped portion) is defined as the "throat-shaped portion size".) Furthermore, the aspect ratio of the pore is defined as a "longitudinal size/throat-shaped portion size".

Figure 5:
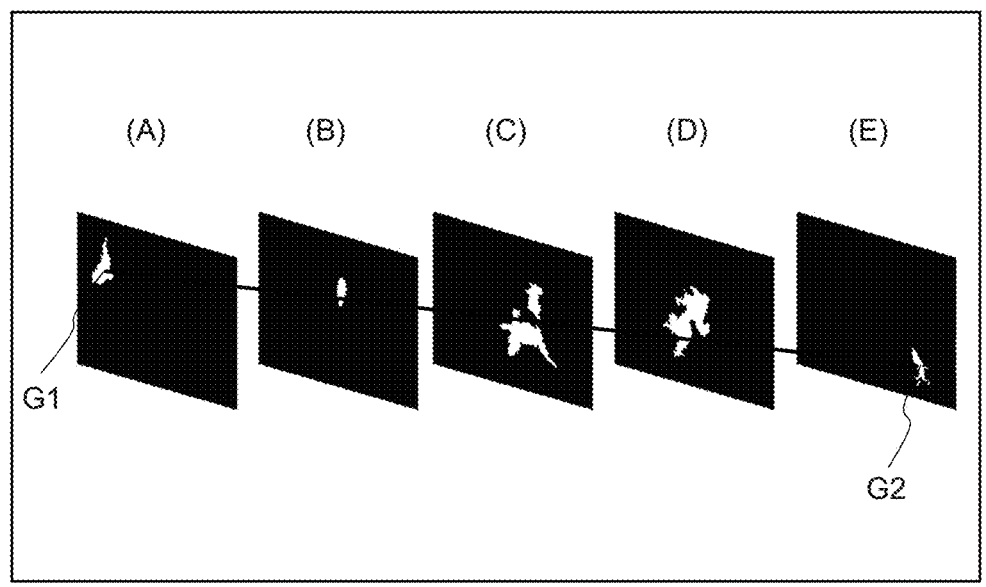
FIG. 5 is a schematic diagram illustrating a pore in the catalyst coating layer cross section at each of A to E in FIG. 4.

Next, FIG. 5 illustrates cross-sectional images (SEM images) of (A) (starting point of pore), (B) (throat-shaped portion of pore), (C) (medium point of longitudinal size of pore), (D) (maximum diameter portion having maximum equivalent circle diameter of pore), and (E) (end point of pore) in FIG. 4. FIG. 5 is a schematic diagram of a cross-sectional image (SEM image) of the pore in the catalyst coating layer cross section in (A) to (E) of FIG. 4. FIG. 5(A) is a schematic diagram of a cross-sectional image of the pore at the starting point (one end portion where the equivalent circle diameter of the pore is 2 μm or more) in the two-dimensional projection diagram of the pore illustrated in FIG. 4, and G1 represents centroid of the pore in the cross-sectional image. FIG. 5(B) is a schematic diagram of the cross-sectional image of the pore in the throat-shaped portion (which has an equivalent circle diameter of the pore of 2 μm or more and is the minimum constriction portion in the path for connecting the starting point and the end point at the shortest distance) in the two-dimensional projection diagram of the pore illustrated in FIG. 4. FIG. 5(C) is a schematic diagram of the cross-sectional image of the pore at the medium point in the path for connecting the starting point and the end point of the longitudinal size at the shortest distance in the two-dimensional projection diagram of the pore illustrated in FIG. 4. FIG. 5(D) is a cross-sectional image of the pore at a position where the equivalent circle diameter of the pore is maximum in the path for connecting the starting point and the end point of the longitudinal size at the shortest distance in the two-dimensional projection diagram of the pore illustrated in FIG. 4. FIG. 5(E) is a schematic diagram of a cross-sectional image of the pore at the end point (other end portion where the equivalent circle diameter of the pore is 2 μm or more) in the two-dimensional projection diagram of the pore illustrated in FIG. 4, and G2 represents centroid of the pore in the cross-sectional image. Here, the linear distance for connecting the starting point (G1 in FIG. 5(A)) of the pore and the end point (G2 in FIG. 5(E)) of the pore in FIG. 5 is defined as the "longitudinal size". In addition, a portion where the equivalent circle diameter in the cross-sectional SEM image is 2 μm or more and is minimum, among the constriction portions in the path for connecting the starting point and the end point of the pore at the shortest distance, is defined as a "throat-shaped portion", and the equivalent circle diameter thereof in the cross-sectional SEM image is defined as a "throat-shaped portion size". The aspect ratio of the pore is defined as a "longitudinal size/throat-shaped portion size". Furthermore, the "average aspect ratio of the high-aspect-ratio pore in the catalyst coating layer" can be determined as follows: aspect ratios of pores are determined in an area of 500 μm or more in the horizontal direction to the substrate flat portion of the catalyst coating layer, 25 μm or more in the perpendicular direction and 1000 μm or more in the axial direction to the substrate flat portion, or any area corresponding thereto: and the average aspect ratio of the high-aspect-ratio pore having an aspect ratio of 5 or more among the pores determined is calculated.

As described above, the rate of the high-aspect-ratio pores relative to the whole volume of voids in the lower catalyst coating layer is in the range from 0.5 to 50% by volume. Too low a rate thereof causes poor pore connectivity. On the other hand, too high a rate thereof causes insufficient gas diffusivity in a direction perpendicular to an exhaust gas flow direction, not imparting sufficient catalyst performance and also causing peeling or the like due to reduction in strength of the catalyst coating layer. Any rate in the above range does not cause such problems. Herein, the rate of the high-aspect-ratio pore relative to the whole volume of voids is preferably in the range from 0.6 to 40.9% by volume, particularly in the range from 1 to 31% by volume, in terms of a balance among gas diffusivity, catalyst performance, and strength of the catalyst coating layer.

The rate of the high-aspect-ratio pore relative to the whole volume of voids in the lower catalyst coating layer can be determined by dividing the porosity of the high-aspect-ratio pore (in an area of 500 μm or more in the horizontal direction to the substrate flat portion of the catalyst coating layer, 25 μm or more in the perpendicular direction to the substrate flat portion, and 1000 μm or more in the axial direction to the substrate flat portion, or any area corresponding thereto) by the porosity of the catalyst coating layer as measured by a weight-in-water method.

Furthermore, in the lower catalyst coating layer, the high-aspect-ratio pore is preferably oriented such that an 80% cumulative angle, in a cumulative angle distribution on an angle basis, of an angle (cone angle) between a vector in a longitudinal direction of the high-aspect-ratio pore and a vector in an exhaust gas flow direction of the substrate is in a range from 0 to 45 degrees. Thus, the gas diffusivity in an exhaust gas flow direction (axial direction of a honeycomb-shaped substrate) can be particularly enhanced to thereby enhance the efficiency of utilization of an active site. Too large an 80% cumulative angle tends to cause an insufficient component in the axial direction of the gas diffusivity, reducing the efficiency of utilization of an active site. Any angle in the above preferred range does not cause such problems. Herein, the 80% cumulative angle is preferably in the range from 15 to 45 degrees, particularly in the range from 30 to 45 degrees, in terms of catalyst performance.

Figure 6:
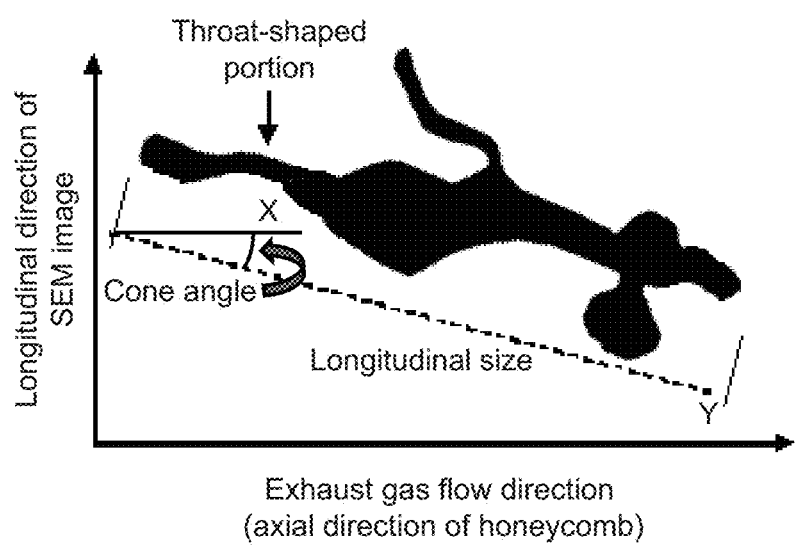
FIG. 6 is a schematic diagram illustrating a cone angle of a high-aspect-ratio pore in the two-dimensional projection diagram of FIG. 4.

The cone angle (orientation angle) of the high-aspect-ratio pore in the lower catalyst coating layer can be measured by analyzing the cross-sectional image of a catalyst coating layer cross section perpendicular to an exhaust gas flow direction (axial direction of a honeycomb-shaped substrate) of the substrate from the three-dimensional information on the pore of the catalyst coating layer. Specifically, for example, in the case of FIB-SEM analysis, the "cone angle" can be determined from an angle between a vector in a longitudinal direction resulting from the "longitudinal size" of the high-aspect-ratio pore obtained as above and a vector in an exhaust gas flow direction of the substrate. FIG. 6 is a schematic diagram illustrating a cone angle (orientation angle) of the high-aspect-ratio pore, and also illustrating one example of a method for determining the "cone angle". FIG. 6 illustrates a vector (Y) in a longitudinal direction of the high-aspect-ratio pore and a vector (X) in an exhaust gas flow direction of the substrate in the two-dimensional projection diagram in FIG. 4, and an angle between the vector (Y) in the longitudinal direction and the vector (X) in an exhaust gas flow direction of the substrate is defined as the "cone angle". The three-dimensional information on the pore (three-dimensional image) can be subjected to image analysis, to thereby calculate the 80% cumulative angle, in a cumulative angle distribution on an angle basis, of the cone angle. Herein, the 80% cumulative angle, in a cumulative angle distribution on an angle basis, of the cone angle of the high-aspect-ratio pore means a cone angle of the aspect-ratio pore which corresponds to the cone angle at 80% in terms of frequency (a cumulative frequency of 80%, on an angle basis of the cone angle) relative to the total number of the high-aspect-ratio pores when the number of the high-aspect-ratio pores is counted from the high-aspect-ratio pore having the smallest cone angle (degrees) in the ascending order. Herein, the 80% cumulative angle, in a cumulative angle distribution on an angle basis, of the cone angle of the high-aspect-ratio pore can be determined by randomly extracting 20 or more of the high-aspect-ratio pores, and determining the 80% cumulative angle, in a cumulative angle distribution on an angle basis, of the cone angle of each of the high-aspect-ratio pores to provide an average value.

(Embodiments of Use of Exhaust Gas Purification Catalyst)

The exhaust gas purification catalyst of the present invention may be used singly or in combination with other catalyst. Such other catalyst is not particularly limited, and a known catalyst (for example, in the case of an exhaust gas purification catalyst for automotives, an oxidation catalyst, a NOx reduction catalyst, a NOx storage reduction catalyst (NSR catalyst), a lean NOx trap catalyst (LNT catalyst), a NOx selective reduction catalyst (SCR catalyst), or the like) may be appropriately used.

[Method for Producing Exhaust Gas Purification Catalyst]

The method for producing an exhaust gas purification catalyst of the present invention, in which the exhaust gas purification catalyst has on a substrate two or more catalyst coating layers, comprises the step of forming a lower catalyst coating layer that is present lower with respect to an uppermost catalyst coating layer using a catalyst slurry comprising a noble metal particle having catalyst activity, a metal oxide particle having a 50% cumulative size of 3 to 10 μm in a cumulative particle size distribution on a volume basis, and a fibrous organic substance in an amount of 0.5 to 9.0 parts by mass based on 100 parts by mass of the metal oxide particle. The fibrous organic substance has an average fiber diameter in a range from 1.7 to 8.0 μm and an average aspect ratio in a range from 9 to 40. When coating the substrate with the catalyst slurry and then heating the catalyst slurry, at least a part of the fibrous organic substance is preferably removed to form a void in the catalyst coating layer. Herein, the uppermost catalyst coating layer, in the catalyst coating layers, can be formed by a conventionally known method, for example, using the same catalyst slurry as described above except for containing no fibrous organic substance.

(Metal Oxide Particle)

The metal oxide particle for use in the catalyst production method of the present invention has a 50% cumulative size of 3 to 10 μm in a cumulative particle size distribution on a volume basis (D50). The 50% cumulative size is preferably a 50%, cumulative size, in a cumulative particle size distribution on a volume basis, measured by a laser diffraction method. The metal oxide is the same as described above with respect to the catalyst particle contained in the catalyst coating layer of the exhaust gas purification catalyst of the present invention. The preparation method of the metal oxide particle is not particularly limited, and a known method can be appropriately adopted. As such a metal oxide particle, a commercially available product may also be used. Examples of the metal oxide particle for use in the method of the present invention include a metal oxide particle (including a composite oxide particle) prepared by a known method, a commercially available metal oxide particle (including a composite oxide particle) or a mixture thereof, or a dispersion liquid obtained by dispersing such a particle in a solvent such as ion-exchange water.

Too small a particle size of the metal oxide particle causes too small a particle size of the catalyst particle (15% cumulative size on cross-sectional area basis) of the catalyst coating layer of the resulting exhaust gas purification catalyst, which results in a decrease in porosity of the catalyst coating layer and therefore deterioration in gas diffusivity to thereby fail to impart sufficient catalyst performance such as NOx purification performance. On the other hand, too large a particle size of the metal oxide particle causes too large a particle size of the catalyst particle (15% cumulative size on cross-sectional area basis) of the catalyst coating layer of the resulting exhaust gas purification catalyst, which results in an increase in gas diffusion resistance in the catalyst particle to thereby fail to impart sufficient catalyst performance such as NOx purification performance. When the 50% cumulative size in a cumulative particle size distribution on a volume basis of the metal oxide particle is in the range from 3 to 10 μm, however, such problems are not caused. Herein, the particle size of the metal oxide particle is preferably in the range from 3 to 9 μm, particularly in the range from 3 to 7 μm, in terms of a 50% cumulative size on a volume basis in view of a balance among coatability, diffraction resistance in the catalyst particle, and catalyst performance.

The particle size (50% cumulative size on volume basis) of the metal oxide particle can be measured by a laser diffraction method, as described above. Specifically, for example, measurement is conducted on (any) 1000 or more of the metal oxide particles randomly extracted, according to a laser diffraction method with a laser diffraction apparatus such as a laser diffraction particle size distribution measurement apparatus, and the 50% cumulative size, in a cumulative particle size distribution on a volume basis, of the metal oxide particle is calculated. Herein, the 50% cumulative size on a volume basis of the metal oxide particle means a particle size of the metal oxide particle which corresponds to the particle size at 50% in terms of frequency (a cumulative frequency of 50% on a volume basis) relative to the total number of the metal oxide particles when the number of the metal oxide particles is counted from the smallest metal oxide particle size (area) in the ascending order. Herein, the particle size refers to a diameter of a minimum circumscribed circle when the cross section is not circular.

The method for preparing the metal oxide particle having such a particle size is not particularly limited, and is as follows, for example: a raw material of the metal oxide particle, such as a metal oxide particle powder, is first provided; the metal oxide particle powder or the like is then mixed with a solvent such as ion-exchange water; and thereafter the resulting solution is subjected to stirring and dispersing of the metal oxide particle powder or the like in a solvent such as water using a medium mill such as a bead mill, other stirring type pulverizing apparatus, or the like to adjust the particle size of the metal oxide particle. Herein, stirring conditions in the case of using a medium mill such as a bead mill are not particularly limited, and the bead size, the treatment time, and the stirring speed are preferably in the range from 100 to 5000 μm, 3 minutes to 1 hour, and 50 to 500 rpm, respectively.

(Preparation and Application of Catalyst Slurry)

In the method for producing the exhaust gas purification catalyst of the present invention, a catalyst slurry is used, the catalyst slurry comprising a noble metal particle having catalyst activity, a metal oxide particle having the 50% cumulative size of 3 to 10 μm in a cumulative particle size distribution on a volume basis, and a fibrous organic substance in an amount of 0.5 to 9.0 parts by mass based on 100 parts by mass of the metal oxide particle.

The noble metal raw material for preparation of the noble metal particle is not particularly limited, and examples thereof include a solution obtained by dissolving a salt (for example, acetate, carbonate, nitrate, an ammonium salt, citrate, or a dinitrodiammine salt) of a noble metal (for example, Pt, Rh, Pd or Ru, or a compound thereof), or a complex thereof (for example, a tetraammine complex) in a solvent such as water or alcohol. In addition, the amount of the noble metal is not particularly limited, the noble metal may be appropriately supported in a required amount depending on the intended design and the like, and the amount is preferably 0.01% by mass or more. Herein, when platinum is used as the noble metal, a platinum salt is not particularly limited, and examples thereof include acetate, carbonate, nitrate, an ammonium salt, citrate or a dinitrodiammine salt of platinum (Pt), or a complex thereof. Among them, a dinitrodiammine salt is preferable because it is easily supported and has a high dispersibility. When palladium is used as the noble metal, a palladium salt is not particularly limited, and examples thereof include a solution of acetate, carbonate, nitrate, an ammonium salt, citrate, a dinitrodiammine salt of palladium (Pd), or a complex thereof. Among them, nitrate or a dinitrodiammine salt is preferable because it is easily supported and has a high dispersibility. Furthermore, the solvent is not particularly limited, and examples thereof include a solvent that can allow dissolution in the form of an ion, such as water (preferably pure water such as ion-exchange water and distilled water).

The fibrous organic substance is not particularly limited as long as it is a substance that can be removed by a heating step described below, and examples thereof include a polyethylene terephthalate (PET) fiber, an acrylic fiber, a nylon fiber, a rayon fiber, and a cellulose fiber. Among them, at least one selected from the group consisting of a PET fiber and a nylon fiber is preferably used in terms of a balance between processability and the firing temperature. By using a catalyst slurry containing such a fibrous organic substance and at least partially removing the fibrous organic substance in a subsequent step, a void having the same shape as that of the fibrous organic substance can be formed in the catalyst coating layer. The void thus formed can serve as a diffusion path of exhaust gas and the resulting catalyst can exhibit excellent catalyst performance even in a region under a high load with a high flow rate of gas.

The fibrous organic substance for use in the catalyst production method of the present invention has an average fiber diameter ranging from 1.7 to 8.0 μm. Too small an average fiber diameter does not impart an effective high-aspect-ratio pore, resulting in insufficient catalyst performance. On the other hand, too large an average fiber diameter increases the thickness of the catalyst coating layer, thereby increasing pressure loss to cause deterioration in fuel efficiency. Any average fiber diameter in the above range does not cause such problems. The average fiber diameter of the fibrous organic substance is preferably in the range from 2.0 to 6.0 μm, particularly in the range from 2.0 to 5.0 μm, in terms of a balance between catalyst performance and coating thickness.

The fibrous organic substance for use in the catalyst production method of the present invention has an average aspect ratio in the range from 9 to 40. Too low an average aspect ratio results in insufficient pore connectivity to thereby cause gas diffusivity to be insufficient. On the other hand, too high an average aspect ratio causes too high a diffusivity to thereby increase a proportion of gas passing through the coating layer without coming into contact with a catalytic active site, not imparting sufficient catalyst performance. Any average aspect ratio in the above range does not cause such problems. The average aspect ratio of the fibrous organic substance is preferably in the range from 9 to 30, particularly in the range from 9 to 28, in terms of a balance between gas diffusivity and catalyst performance. Herein, the average aspect ratio of the fibrous organic substance is defined as an "average fiber length/average fiber diameter". Herein, the fiber length means the linear distance for connecting the starting point and the end point of the fiber. The average fiber length can be determined by randomly extracting 50 or more of the fibrous organic substances, measuring the fiber length of each of the fibrous organic substances, and calculating an average value. In addition, the average fiber diameter can be determined by randomly extracting 50 or more of the fibrous organic substances, measuring the fiber diameter of each of the fibrous organic substances, and calculating an average value.

In the catalyst production method of the present invention, the fibrous organic substance is used in an amount of 0.5 to 9.0 parts by mass based on 100 parts by mass of the metal oxide particle in a catalyst slurry for formation of the lower catalyst coating layer. Too small an amount of the fibrous organic substance mixed fails to impart sufficient pore connectivity, resulting in insufficient catalyst performance. On the other hand, too large an amount thereof increases the thickness of the catalyst coating layer, thereby increasing pressure loss to cause deterioration in fuel efficiency. Any amount in the above range does not cause such problems. Herein, the fibrous organic substance is preferably used in an amount of 0.5 to 8.0 parts by mass, particularly 1.0 to 5.0 parts by mass, based on 100 parts by mass of the metal oxide particle in the catalyst slurry, in terms of a balance between catalyst performance and pressure loss. Herein, the fibrous organic substance more preferably has an average fiber diameter in the range from 2.0 to 6.0 μm and an average aspect ratio in the range from 9 to 30.

The method for preparing the catalyst slurry is not particularly limited. The metal oxide particle, the noble metal raw material, and the fibrous organic substance may be mixed, if necessary with a known binder or the like, and a known method can be appropriately adopted. Herein, conditions of such mixing are not particularly limited. For example, the stirring speed and the treatment time are preferably in the range from 100 to 400 rpm and 30 minutes or more, respectively, and the fibrous organic substance may be uniformly dispersed and mixed in the catalyst slurry. The mixing order is not particularly limited, and there may be adopted any of the following methods, for example: a method where the noble metal raw material is mixed with a dispersion liquid including the metal oxide particle to support the noble metal, and thereafter the fibrous organic substance is mixed therewith; a method where the fibrous organic substance is mixed with a dispersion liquid including the metal oxide particle and thereafter the noble metal raw material is mixed therewith; a method where the noble metal raw material and the fibrous organic substance are simultaneously mixed in a dispersion liquid including the metal oxide particle; and a method where the metal oxide particle and the fibrous organic substance are mixed with a solution including the noble metal raw material. Treatment conditions are not particularly limited, and are appropriately selected depending on the design of the intended exhaust gas purification catalyst or the like.

The surface of the substrate is coated with the catalyst slurry containing a fibrous organic substance to thereby form a catalyst slurry layer preferably such that the amount of coating of the catalyst coating layer after firing is in a range from 50 to 300 g per liter of the volume of the substrate and that the average thickness of the catalyst coating layer after firing is in a range from 25 μm to 160 μm. The coating method is not particularly limited, and a known method can be appropriately adopted. Specific examples include a method where a honeycomb-shaped substrate is dipped in to coat the substrate with the catalyst slurry (dipping method), a wash coat method, and a method where the catalyst slurry is injected by an injection means. Herein, the surface of the honeycomb-shaped substrate is needed to be coated with the catalyst slurry under coating conditions such that the following are satisfied: the amount of coating of the catalyst coating layer after firing is in the range from 50 to 300 g per liter of the volume of the substrate, and the average thickness of the catalyst coating layer after firing is in the range from 25 μm to 160 μm.

In the catalyst production method of the present invention, the substrate is coated with the catalyst slurry, and then heated to thereby evaporate the solvent or the like included in the slurry and also remove the fibrous organic substance. Such heating is typically conducted by firing the substrate coated with the catalyst slurry. Such firing is preferably conducted at a temperature in the range from 300 to 800° C., particularly preferably from 400 to 700° C. Too low a firing temperature tends to cause the fibrous organic substance to remain, and on the other hand, too high a firing temperature tends to sinter the noble metal particle. Any firing temperature in the above preferred range does not cause such problems. The firing time varies depending on the firing temperature, and is preferably 20 minutes or more, more preferably 30 minutes to 2 hours. Furthermore, the atmosphere in firing is not particularly limited, and is preferably in the air or in an atmosphere of inert gas such as nitrogen ($N_2$).

The exhaust gas purification catalyst comprising two or more catalyst coating layers can be prepared by coating the substrate with the catalyst slurry and heating it to thereby form the catalyst coating on the substrate, and coating again the resultant with a catalyst slurry different therefrom in composition, namely, the amounts and the types of the metal oxide, the noble metal and the like, and heating it, in a repeated manner. The exhaust gas purification catalyst of the present invention can be prepared by using a catalyst slurry including the fibrous organic substance described above, in addition a noble metal particle and a metal oxide particle to form a lower catalyst coating layer, and then using a catalyst slurry including no fibrous organic substance to form an uppermost catalyst coating layer thereon.

The exhaust gas purification catalyst of the present invention is used for a method for purifying exhaust gas where exhaust gas discharged from an internal combustion engine is brought into contact with the catalyst. The method for bringing exhaust gas into contact with the exhaust gas purification catalyst is not particularly limited, and a known method can be appropriately adopted. For example, a method may be adopted where the exhaust gas purification catalyst according to the present invention is disposed in an exhaust gas tube through which gas discharged from an internal combustion engine flows, thereby bringing exhaust gas discharged from an internal combustion engine into contact with the exhaust gas purification catalyst.

The exhaust gas purification catalyst of the present invention exhibits excellent catalyst performance even in a region under a high load with a high flow rate of gas. Therefore, for example, when exhaust gas discharged from an internal combustion engine of an automotive or the like is brought into contact with the exhaust gas purification catalyst of the present invention, exhaust gas can be purified even in a region under a high load with a high flow rate of gas. The exhaust gas purification catalyst of the present invention can be used for purifying harmful components such as harmful gases (hydrocarbon (HC), carbon monoxide (CO), nitrogen oxides (NOx)) in exhaust gas discharged from an internal combustion engine of an automotive or the like.

EXAMPLES

Hereinafter, the present invention will be described in more detail with reference to Examples, but the present invention is not intended to be limited to these Examples.
[Test 1: Preparation and Evaluation of Catalyst Including One Catalyst Coating Layer Having Void]
1. Preparation of Catalyst (1) Example 1

First, 150 g of an $Al_2O_3$ powder (produced by Sasol: specific surface area: 100 m$^2$/g, average particle size: 30 μm) and 300 g of a powder of a $CeO_2$—$ZrO_2$ solid solution (produced by Daiichi Kigenso Kagaku Kogyo Co., Ltd.: $CeO_2$ content: 20% by mass, $ZrO_2$ content: 25% by mass, specific surface area: 100 m$^2$/g, average particle size: 10 nm) were added to 500 g of ion-exchange water and mixed to provide a solution. The solution was subjected to a stirring treatment under the following conditions: a bead mill (produced by As One Corporation, trade name "alumina ball", beads used: microbeads having a diameter of 5000 μm and made of alumina) was used, and the treatment time was 25 minutes and the stirring speed was 400 rpm. Thus, a dispersion liquid including a metal oxide particle made of a mixture (composite metal oxide) of the $CeO_2$—$ZrO_2$ solid solution and the $Al_2O_3$ powder was prepared. Herein, the particle size of the metal oxide particle was measured by using a laser diffraction particle size distribution measurement apparatus (manufactured by HORIBA Ltd., trade name "LA-920") according to a laser diffraction method, and it was found that the 50% cumulative size in a cumulative particle size distribution on an area basis was 3.2 μm.

Next, 0.05 L of a dinitroammine platinum solution including 4 g of platinum (Pt) in terms of metal, as a noble metal raw material, and 1.0 part by mass of an organic fiber (PET fiber, average diameter: 3 μm×length: 42 μm, average aspect ratio: 14) as a fibrous organic substance based on 100 parts by mass of the metal oxide particle were added to the resulting dispersion liquid, and the resultant was mixed under a condition of a stirring speed of 400 rpm for 30 minutes, thereby preparing a catalyst slurry.

Next, a hexagonal cell cordierite monolith honeycomb substrate (manufactured by Denso Corporation, trade name "D60H/3-9R-08EK", diameter: 103 mm, length: 105 mm, volume: 875 ml, cell density: 600 cell/inch$^2$) as a substrate was wash coated with the resulting catalyst slurry, and dried in the air under a temperature condition of 100° C. for 0.5 hours. Thereafter wash coating of the substrate with such a catalyst slurry, and drying/calcining were repeatedly performed so that the amount of coating on the substrate was 100 g per liter of the volume of the substrate, thereby forming a catalyst slurry layer on the substrate.

Thereafter, the resultant was fired in the air under a temperature condition of 500° C. for 2 hours, thereby providing an exhaust gas purification catalyst (catalyst sample) in which a catalyst coating layer made of a catalyst particle was formed on the substrate surface made of the honeycomb-shaped cordierite monolith substrate.

Table 1 shows the treatment time [min] of the stirring treatment and the particle size (50% cumulative size on volume basis) [μm] of the resulting metal oxide particle in the oxide particle preparation step; the type of a raw material, the average fiber diameter [μm], the average aspect ratio and the amount mixed [parts by mass] of the fibrous organic substance used in the catalyst slurry preparation step; and the amount of coating [g/L] of the catalyst coating layer.

TABLE 1

| | Oxide particle preparation step | | Fibrous organic substance | | | |
|---|---|---|---|---|---|---|
| | Stirring treatment Treatment time (min) | Metal oxide particle Particle size (50% cumulative size on volume basis) [μm] | Type of raw material | Average fiber diameter or average diameter [μm] | Average aspect ratio | Amount mixed (parts by mass) |
| Example 1 | 25 | 3.2 | PET fiber | 3.0 | 14 | 1.0 |
| Example 2 | 15 | 4.6 | PET fiber | 3.0 | 14 | 1.0 |
| Example 3 | 13 | 6.4 | PET fiber | 3.0 | 14 | 1.0 |
| Example 4 | 7 | 9.5 | PET fiber | 3.0 | 14 | 1.0 |
| Example 5 | 15 | 4.6 | PET fiber | 3.0 | 14 | 2.0 |
| Example 6 | 17 | 6.4 | PET fiber | 3.0 | 14 | 2.0 |
| Example 7 | 5 | 9.5 | PET fiber | 3.0 | 14 | 2.0 |
| Example 8 | 25 | 3.2 | PET fiber | 3.0 | 14 | 5.0 |
| Example 9 | 15 | 4.6 | PET fiber | 3.0 | 14 | 5.0 |
| Example 10 | 5 | 9.5 | PET fiber | 3.0 | 14 | 5.0 |
| Example 11 | 26 | 3.2 | PET fiber | 3.0 | 14 | 7.0 |
| Example 12 | 17 | 4.6 | PET fiber | 3.0 | 14 | 7.0 |
| Example 13 | 12 | 6.4 | PET fiber | 3.0 | 14 | 7.0 |
| Example 14 | 4 | 9.5 | PET fiber | 3.0 | 14 | 7.0 |
| Example 15 | 24 | 3.2 | PET fiber | 2.0 | 21 | 3.0 |

TABLE 1-continued

| | | | | | | |
|---|---|---|---|---|---|---|
| Example 16 | 14 | 4.6 | PET fiber | 2.0 | 21 | 3.0 |
| Example 17 | 11 | 6.4 | PET fiber | 2.0 | 21 | 3.0 |
| Example 18 | 27 | 3.2 | PET fiber | 2.0 | 21 | 5.0 |
| Example 19 | 15 | 4.6 | PET fiber | 2.0 | 21 | 5.0 |
| Example 20 | 12 | 6.4 | PET fiber | 2.0 | 21 | 5.0 |
| Example 21 | 24 | 3.2 | PET fiber | 5.0 | 10 | 1.0 |
| Example 22 | 19 | 4.6 | PET fiber | 5.0 | 10 | 1.0 |
| Example 23 | 13 | 6.4 | PET fiber | 5.0 | 10 | 1.0 |

| | Catalyst coating layer | | | | | | |
|---|---|---|---|---|---|---|---|
| | | Particle size of catalyst particle (15% cumulative size on cross-sectional area basis) [µm] | Average thickness [µm] | Porosity (% by volume) | High-aspect-ratio pore | | Catalyst performance NOx conversion efficiency [%] |
| | Amount of coating [g/L] | | | | Average aspect ratio | Orientation angle (degrees) | Rate relative to whole of voids (% by volume) | |
| Example 1 | 100 | 3.4 | 32.0 | 51.2 | 17.6 | 38.1 | 2.4 | 83.1 |
| Example 2 | 100 | 5.4 | 56.2 | 66.8 | 19.1 | 41.3 | 7.4 | 84.6 |
| Example 3 | 100 | 6.9 | 69.0 | 73.2 | 19.8 | 38.6 | 7.8 | 82.1 |
| Example 4 | 100 | 9.7 | 86.5 | 78.6 | 21.0 | 42.3 | 8.6 | 81.7 |
| Example 5 | 100 | 5.4 | 52.7 | 64.9 | 18.9 | 38.4 | 11.1 | 89.1 |
| Example 6 | 100 | 6.9 | 68.2 | 71.7 | 20.7 | 39.5 | 9.1 | 87.5 |
| Example 7 | 100 | 9.7 | 88.8 | 77.8 | 21.4 | 42.1 | 15.2 | 84.8 |
| Example 8 | 100 | 3.4 | 40.4 | 59.0 | 20.0 | 40.3 | 49.7 | 88.7 |
| Example 9 | 100 | 5.4 | 58.8 | 68.9 | 20.4 | 39.3 | 18.8 | 90.4 |
| Example 10 | 100 | 9.7 | 90.3 | 78.8 | 22.1 | 43.3 | 20.1 | 86.1 |
| Example 11 | 100 | 3.4 | 37.5 | 56.5 | 19.9 | 37.5 | 34.4 | 83.7 |
| Example 12 | 100 | 5.4 | 60.6 | 69.7 | 21.1 | 38.7 | 22.8 | 83.9 |
| Example 13 | 100 | 6.9 | 70.0 | 72.6 | 21.3 | 44.4 | 14.0 | 82.9 |
| Example 14 | 100 | 10.0 | 96.1 | 79.5 | 21.6 | 41.9 | 23.9 | 82.5 |
| Example 15 | 100 | 3.4 | 33.0 | 53.2 | 22.7 | 24.7 | 14.3 | 84.2 |
| Example 16 | 100 | 5.4 | 59.0 | 68.7 | 23.4 | 25.0 | 17.5 | 82.5 |
| Example 17 | 100 | 6.9 | 65.6 | 70.5 | 25.5 | 27.7 | 3.4 | 85.9 |
| Example 18 | 100 | 3.4 | 38.0 | 57.2 | 26.2 | 24.5 | 39.2 | 85.9 |
| Example 19 | 100 | 5.4 | 62.6 | 70.5 | 25.7 | 24.6 | 27.0 | 84.2 |
| Example 20 | 100 | 6.9 | 68.7 | 72.5 | 26.9 | 27.2 | 13.3 | 91.1 |
| Example 21 | 100 | 3.4 | 30.5 | 50.9 | 10.5 | 42.2 | 0.7 | 87.8 |
| Example 22 | 100 | 5.4 | 49.5 | 65.1 | 11.0 | 43.2 | 0.6 | 86.4 |
| Example 23 | 100 | 6.9 | 63.2 | 71.1 | 13.4 | 44.7 | 6.1 | 91.5 |

Each catalyst slurry was obtained in the same manner as in Example 1 except that the treatment time by a bead mill was changed as shown in Table 1 and Table 2, the stirring treatment was performed by a bead mill so that the particle size of the metal oxide particle was as shown in Table 1 and Table 2 in terms of the 50% cumulative size in a cumulative particle size distribution on a volume basis, and a fibrous organic substance, the type of a raw material, the average fiber diameter, the average aspect ratio and the amount mixed of which were as shown in Table 1 and Table 2, was used as the fibrous organic substance. Next, a cordierite monolith honeycomb substrate was coated with the resulting catalyst slurry in the same manner as in Example 1, and the resultant was fired to provide an exhaust gas purification catalyst (catalyst sample).

Herein, each fibrous organic substance used in Examples 31 to 39 was prepared by adding titanium isopropoxide (Ti(OPri)$_4$), polyethylene glycol (PEG) and a polymethyl methacrylate resin (PMMA) particle (average diameter: 3 µm) to isopropanol, and pouring the resultant into distilled water, thereby preparing an organic fiber having a predetermined shape.

Table 1 and Table 2 show the treatment time [min] of the stirring treatment and the particle size (50% cumulative size on volume basis) [µm] of the resulting metal oxide particle in the oxide particle preparation step; the type of a raw material, the average fiber diameter [µm], the average aspect ratio and the amount mixed [parts by mass] of the fibrous organic substance used in the catalyst slurry preparation step: and the amount of coating [g/L] with the catalyst coating layer.

TABLE 2

| | Oxide particle preparation step | | Fibrous organic substance | | | |
|---|---|---|---|---|---|---|
| | Stirring treatment Treatment time (min) | Metal oxide particle Particle size (50% cumulative size on volume basis) [μm] | Type of raw material | Average fiber diameter or average diameter [μm] | Average aspect ratio | Amount mixed (parts by mass) |
| Example 24 | 6 | 9.5 | PET fiber | 5.0 | 10 | 2.0 |
| Example 25 | 24 | 3.2 | PET fiber | 5.0 | 10 | 2.0 |
| Example 26 | 16 | 4.6 | PET fiber | 5.0 | 10 | 2.0 |
| Example 27 | 6 | 9.5 | PET fiber | 5.0 | 10 | 2.0 |
| Example 28 | 25 | 3.2 | PET fiber | 5.0 | 10 | 3.0 |
| Example 29 | 16 | 4.6 | PET fiber | 5.0 | 10 | 3.0 |
| Example 30 | 24 | 3.2 | PET fiber | 5.0 | 10 | 5.0 |
| Example 31 | 16 | 4.6 | PMMA particle + TiOPr + PEG | 3.0 | 11 | 3.0 |
| Example 32 | 13 | 6.4 | PMMA particle + TiOPr + PEG | 3.0 | 11 | 3.0 |
| Example 33 | 25 | 3.2 | PMMA particle + TiOPr + PEG | 3.0 | 11 | 5.0 |
| Example 34 | 15 | 4.6 | PMMA particle + TiOPr + PEG | 3.0 | 11 | 5.0 |
| Example 35 | 4 | 9.5 | PMMA particle + TiOPr + PEG | 3.0 | 11 | 5.0 |
| Example 36 | 25 | 3.2 | PMMA particle + TiOPr + PEG | 3.0 | 11 | 7.0 |
| Example 37 | 17 | 4.6 | PMMA particle + TiOPr + PEG | 3.0 | 11 | 7.0 |
| Example 38 | 12 | 6.4 | PMMA particle + TiOPr + PEG | 3.0 | 11 | 7.0 |
| Example 39 | 5 | 9.5 | PMMA particle + TiOPr + PEG | 3.0 | 11 | 7.0 |
| Example 40 | 16 | 4.6 | PET fiber | 2.0 | 40 | 3.0 |
| Example 41 | 16 | 4.6 | PET fiber | 2.0 | 40 | 3.0 |
| Example 42 | 16 | 4.6 | PET fiber | 2.0 | 40 | 3.0 |

| | Catalyst coating layer | | | | High-aspect-ratio pore | | | |
|---|---|---|---|---|---|---|---|---|
| | Amount of coating [g/L] | Particle size of catalyst particle (15% cumulative size on cross-sectional area basis) [μm] | Average thickness [μm] | Porosity (% by volume) | Average aspect ratio | Orientation angle (degrees) | Rate relative to whole of voids (% by volume) | Catalyst performance NOx conversion efficiency [%] |
| Example 24 | 100 | 9.7 | 85.0 | 76.9 | 14.6 | 41.3 | 11.0 | 84.3 |
| Example 25 | 100 | 3.4 | 31.5 | 52.8 | 11.0 | 41.4 | 12.1 | 87.8 |
| Example 26 | 100 | 6.0 | 65.2 | 70.6 | 13.9 | 41.4 | 3.4 | 90.7 |
| Example 27 | 100 | 9.7 | 84.7 | 76.5 | 16.3 | 42.1 | 9.0 | 84.3 |
| Example 28 | 100 | 3.4 | 33.7 | 53.7 | 11.7 | 41.1 | 17.5 | 86.5 |
| Example 29 | 100 | 5.4 | 55.5 | 66.2 | 12.5 | 40.3 | 4.1 | 83.7 |
| Example 30 | 100 | 3.4 | 36.3 | 56.4 | 12.8 | 38.3 | 34.1 | 88.7 |
| Example 31 | 100 | 5.4 | 57.5 | 68.7 | 12.1 | 41.0 | 17.5 | 80.9 |
| Example 32 | 100 | 6.9 | 68.8 | 71.7 | 11.1 | 42.3 | 9.4 | 91.3 |
| Example 33 | 100 | 3.4 | 37.2 | 57.5 | 13.0 | 43.7 | 40.9 | 86.9 |
| Example 34 | 100 | 5.4 | 56.0 | 66.7 | 13.8 | 43.8 | 7.0 | 91.8 |
| Example 35 | 100 | 9.7 | 95.5 | 78.1 | 16.5 | 43.9 | 28.7 | 85.9 |
| Example 36 | 100 | 3.4 | 35.1 | 54.6 | 17.0 | 41.1 | 23.1 | 92.9 |
| Example 37 | 100 | 5.4 | 57.8 | 66.5 | 17.9 | 42.0 | 16.3 | 95.5 |
| Example 38 | 100 | 6.9 | 69.2 | 73.0 | 20.0 | 41.1 | 15.8 | 96.8 |
| Example 39 | 100 | 9.7 | 90.0 | 78.7 | 20.9 | 40.1 | 19.8 | 91.8 |
| Example 40 | 50 | 5.4 | 28.0 | 66.9 | 40.2 | 19.8 | 35.9 | 81.1 |
| Example 41 | 200 | 5.4 | 102.3 | 68.2 | 43.5 | 20.0 | 38.2 | 82.3 |
| Example 42 | 300 | 5.4 | 152.1 | 69.4 | 46.2 | 18.6 | 39.4 | 81.9 |

Each comparative catalyst slurry was obtained in the same manner as in Example 1 except that the treatment time by a bead mill was changed as shown in Table 3, the stirring treatment was performed by a bead mill so that the particle size of the metal oxide particle was as shown in Table 3 in terms of the 50% cumulative size in a cumulative particle size distribution on a volume basis, and no organic substance (fibrous organic substance) was used. Next, a cordierite monolith honeycomb substrate was coated with the resulting comparative catalyst slurry in the same manner as in Example 1, and the resultant was fired to provide a comparative exhaust gas purification catalyst (comparative catalyst sample).

Table 3 shows the treatment time [min] of the stirring treatment and the particle size (50% cumulative size on volume basis) [μm] of the resulting metal oxide particle in the oxide particle preparation step, and the amount of coating [g/L] with the catalyst coating layer.

TABLE 3

| | Oxide particle preparation step | | Fibrous organic substance or organic substance | | | |
|---|---|---|---|---|---|---|
| | Stirring treatment Treatment time (min) | Metal oxide particle Particle size (50% cumulative size on volume basis) [μm] | Type of raw material | Average fiber diameter or average diameter [μm] | Average aspect ratio | Amount mixed (parts by mass) |
| Comparative Example 1 | 41 | 0.1 | — | — | — | — |
| Comparative Example 2 | 36 | 1.9 | — | — | — | — |
| Comparative Example 3 | 24 | 3.2 | — | — | — | — |
| Comparative Example 4 | 15 | 4.6 | — | — | — | — |
| Comparative Example 5 | 12 | 6.4 | — | — | — | — |
| Comparative Example 6 | 6 | 9.5 | — | — | — | — |
| Comparative Example 7 | 3 | 12.0 | — | — | — | — |
| Comparative Example 8 | 14 | 4.6 | PET fiber | 3.0 | 21 | 1.0 |
| Comparative Example 9 | 3 | 12.0 | PET fiber | 3.0 | 21 | 1.0 |
| Comparative Example 10 | 45 | 0.7 | PET fiber | 3.0 | 21 | 3.0 |
| Comparative Example 11 | 3 | 12.0 | PET fiber | 3.0 | 21 | 3.0 |
| Comparative Example 12 | 45 | 0.1 | PET fiber | 3.0 | 21 | 5.0 |
| Comparative Example 13 | 24 | 3.2 | PET fiber | 3.0 | 21 | 5.0 |
| Comparative Example 14 | 45 | 0.7 | PET fiber | 3.0 | 21 | 7.0 |
| Comparative Example 15 | 3 | 12.0 | PET fiber | 3.0 | 21 | 7.0 |
| Comparative Example 16 | 3 | 12.0 | PET fiber | 3.0 | 14 | 0.5 |
| Comparative Example 17 | 3 | 12.0 | PET fiber | 3.0 | 14 | 2.0 |
| Comparative Example 18 | 3 | 12.0 | PET fiber | 3.0 | 14 | 5.0 |
| Comparative Example 19 | 3 | 12.0 | PET fiber | 3.0 | 14 | 9.0 |
| Comparative Example 20 | 24 | 3.2 | PET fiber | 3.0 | 50 | 1.0 |
| Comparative Example 21 | 14 | 4.6 | PET fiber | 3.0 | 50 | 1.0 |
| Comparative Example 22 | 17 | 6.4 | PET fiber | 3.0 | 50 | 1.0 |
| Comparative Example 23 | 6 | 9.5 | PET fiber | 3.0 | 50 | 1.0 |

| | Catalyst coating layer | | | | | High-aspect-ratio pore | | |
|---|---|---|---|---|---|---|---|---|
| | Amount of coating [g/L] | Particle size of catalyst particle (15% cumulative size on cross-sectional area basis) [μm] | Average thickness [μm] | Porosity (% by volume) | Average aspect ratio | Orientation angle (degrees) | Rate relative to whole of voids (% by volume) | Catalyst performance NOx conversion efficiency [%] |
| Comparative Example 1 | 100 | 0.9 | 18.0 | 39.7 | 5.0 | 74.0 | 0.01 | 60.0 |
| Comparative Example 2 | 100 | 2.4 | 23.0 | 44.7 | 5.2 | 80.0 | 0.02 | 65.2 |
| Comparative Example 3 | 100 | 3.4 | 28.0 | 50.3 | 5.5 | 63.0 | 0.04 | 73.0 |
| Comparative Example 4 | 100 | 5.4 | 52.0 | 64.8 | 5.6 | 77.0 | 0.06 | 73.8 |
| Comparative Example 5 | 100 | 6.9 | 62.0 | 69.3 | 5.8 | 65.0 | 0.08 | 72.4 |
| Comparative Example 6 | 100 | 9.7 | 84.0 | 74.1 | 5.7 | 66.0 | 0.09 | 72.1 |
| Comparative Example 7 | 100 | 13.0 | 91.0 | 79.1 | 6.0 | 57.4 | 0.11 | 63.5 |
| Comparative Example 8 | 100 | 5.4 | 53.2 | 65.0 | 6.8 | 61.4 | 0.10 | 74.7 |
| Comparative Example 9 | 100 | 13.0 | 89.5 | 77.9 | 6.5 | 70.2 | 0.12 | 62.6 |
| Comparative Example 10 | 100 | 0.9 | 29.6 | 50.9 | 6.6 | 59.2 | 59.86 | 63.7 |
| Comparative Example 11 | 100 | 13.0 | 94.8 | 80.0 | 7.1 | 60.2 | 11.60 | 67.6 |
| Comparative Example 12 | 100 | 0.9 | 29.3 | 50.8 | 7.0 | 54.1 | 59.46 | 61.7 |
| Comparative Example 13 | 100 | 3.4 | 40.6 | 59.6 | 6.9 | 60.4 | 51.19 | 77.0 |
| Comparative Example 14 | 100 | 0.9 | 30.1 | 50.8 | 7.5 | 53.1 | 59.58 | 60.3 |
| Comparative Example 15 | 100 | 13.0 | 91.5 | 78.6 | 7.3 | 60.0 | 15.32 | 64.0 |
| Comparative Example 16 | 100 | 13.0 | 91.0 | 79.3 | 12.1 | 65.0 | 5.24 | 67.3 |

TABLE 3-continued

| | | | | | | | | |
|---|---|---|---|---|---|---|---|---|
| Comparative Example 17 | 100 | 13.0 | 93.6 | 78.9 | 15.1 | 56.3 | 8.39 | 76.7 |
| Comparative Example 18 | 100 | 13.0 | 97.9 | 81.4 | 16.1 | 40.3 | 11.26 | 76.5 |
| Comparative Example 19 | 100 | 13.0 | 95.8 | 80.4 | 17.6 | 42.1 | 15.26 | 60.3 |
| Comparative Example 20 | 100 | 3.4 | 30.0 | 50.9 | 50.2 | 7.2 | 55.14 | 74.3 |
| Comparative Example 21 | 100 | 5.4 | 54.4 | 65.7 | 50.0 | 8.2 | 57.33 | 72.9 |
| Comparative Example 22 | 100 | 6.9 | 63.8 | 71.3 | 53.0 | 9.2 | 59.92 | 72.1 |
| Comparative Example 23 | 100 | 9.7 | 82.7 | 77.2 | 50.1 | 10.1 | 61.44 | 72.5 |

Each comparative catalyst slurry was obtained in the same manner as in Example 1 except that the treatment time by a bead mill was changed as shown in Table 3 to Table 8, the stirring treatment was performed by a bead mill so that the particle size of the metal oxide particle was as shown in Table 3 to Table 8 in terms of the 50% cumulative size in a cumulative particle size distribution on a volume basis, a fibrous organic substance or an organic substance, the type of a raw material, the average fiber diameter or the average diameter, the average aspect ratio and the amount mixed of which were as shown in Table 3 to Table 8, was used as the fibrous organic substance or the organic substance. Next, a cordierite monolith honeycomb substrate was coated with the resulting comparative catalyst slurry in the same manner as in Example 1, and the resultant was fired to provide a comparative exhaust gas purification catalyst (comparative catalyst sample).

Herein, each organic substance (fibrous organic substance) used in Comparative Examples 127 to 131 was prepared by adding titanium isopropoxide (Ti(OPri)$_4$), polyethylene glycol (PEG) and a polymethyl methacrylate resin (PMMA) particle (average diameter: 3 μm) to isopropanol, and pouring the resultant into distilled water, thereby preparing an organic fiber having a predetermined shape.

Table 3 to Table 8 show the treatment time [min] of the stirring treatment and the particle size (50% cumulative size on volume basis) [μm] of the resulting metal oxide particle in the oxide particle preparation step, the type of a raw material, the average fiber diameter or the average diameter [μm], the average aspect ratio and the amount mixed [parts by mass] of the fibrous organic substance or the organic substance used in the catalyst slurry preparation step, and the amount of coating [g/L] with the catalyst coating layer.

TABLE 4

| | Oxide particle preparation step | | Fibrous organic substance or organic substance | | | |
|---|---|---|---|---|---|---|
| | Stirring treatment Treatment time (min) | Metal oxide particle Particle size (50% cumulative size on volume basis) [μm] | Type of raw material | Average fiber diameter or average diameter [μm] | Average aspect ratio | Amount mixed (parts by mass) |
| Comparative Example 24 | 3 | 12.0 | PET fiber | 3.0 | 50 | 1.0 |
| Comparative Example 25 | 12 | 6.4 | PET fiber | 3.0 | 50 | 2.0 |
| Comparative Example 26 | 3 | 12.0 | PET fiber | 3.0 | 50 | 2.0 |
| Comparative Example 27 | 24 | 3.2 | PET fiber | 3.0 | 50 | 3.0 |
| Comparative Example 28 | 12 | 6.4 | PET fiber | 3.0 | 50 | 3.0 |
| Comparative Example 29 | 5 | 9.5 | PET fiber | 3.0 | 50 | 3.0 |
| Comparative Example 30 | 24 | 3.2 | PET fiber | 3.0 | 50 | 5.0 |
| Comparative Example 31 | 14 | 4.6 | PET fiber | 3.0 | 50 | 5.0 |
| Comparative Example 32 | 3 | 12.0 | PET fiber | 3.0 | 50 | 5.0 |
| Comparative Example 33 | 24 | 3.2 | PET fiber | 3.0 | 50 | 7.0 |
| Comparative Example 34 | 14 | 4.6 | PET fiber | 3.0 | 50 | 7.0 |
| Comparative Example 35 | 6 | 6.4 | PET fiber | 3.0 | 50 | 7.0 |
| Comparative Example 36 | 5 | 9.5 | PET fiber | 3.0 | 50 | 7.0 |
| Comparative Example 37 | 3 | 12.0 | PET fiber | 3.0 | 50 | 7.0 |
| Comparative Example 38 | 3 | 12.0 | PET fiber | 2.0 | 21 | 2.0 |
| Comparative Example 39 | 3 | 12.0 | PET fiber | 2.0 | 21 | 5.0 |
| Comparative Example 40 | 3 | 12.0 | PET fiber | 2.0 | 21 | 7.0 |
| Comparative Example 41 | 3 | 12.0 | PET fiber | 5.0 | 10 | 1.0 |
| Comparative Example 42 | 45 | 0.7 | PET fiber | 5.0 | 10 | 2.0 |
| Comparative Example 43 | 45 | 0.7 | PET fiber | 5.0 | 10 | 3.0 |
| Comparative Example 44 | 3 | 12.0 | PET fiber | 5.0 | 10 | 3.0 |
| Comparative Example 45 | 45 | 0.7 | PET fiber | 5.0 | 10 | 5.0 |
| Comparative Example 46 | 3 | 12.0 | PET fiber | 5.0 | 10 | 7.0 |

TABLE 4-continued

| | Catalyst coating layer | | | | | | | |
|---|---|---|---|---|---|---|---|---|
| | | Particle size of catalyst particle (15% cumulative size on cross-sectional area basis) [µm] | | High-aspect-ratio pore | | | | |
| | Amount of coating [g/L] | | Average thickness [µm] | Porosity (% by volume) | Average aspect ratio | Orientation angle (degrees) | Rate relative to whole of voids (% by volume) | Catalyst performance NOx conversion efficiency [%] |
| Comparative Example 24 | 100 | 13.0 | 89.8 | 78.2 | 40.2 | 12.1 | 65.12 | 63.9 |
| Comparative Example 25 | 100 | 6.9 | 67.0 | 71.0 | 52.4 | 9.0 | 55.42 | 74.5 |
| Comparative Example 26 | 100 | 13.0 | 95.5 | 79.2 | 45.1 | 20.1 | 60.10 | 62.9 |
| Comparative Example 27 | 100 | 3.4 | 33.2 | 54.1 | 53.3 | 6.9 | 56.63 | 72.3 |
| Comparative Example 28 | 100 | 6.9 | 67.0 | 72.2 | 51.3 | 8.1 | 58.56 | 73.4 |
| Comparative Example 29 | 100 | 9.7 | 86.9 | 78.1 | 54.2 | 9.4 | 52.11 | 70.5 |
| Comparative Example 30 | 100 | 3.4 | 36.8 | 56.1 | 54.0 | 6.7 | 72.20 | 70.7 |
| Comparative Example 31 | 100 | 5.4 | 61.8 | 70.0 | 51.9 | 6.7 | 62.39 | 72.2 |
| Comparative Example 32 | 100 | 13.0 | 99.6 | 81.0 | 40.1 | 10.6 | 61.00 | 62.5 |
| Comparative Example 33 | 100 | 3.4 | 34.1 | 55.2 | 51.0 | 6.0 | 65.52 | 70.5 |
| Comparative Example 34 | 100 | 5.4 | 61.3 | 69.5 | 52.8 | 6.8 | 58.63 | 69.3 |
| Comparative Example 35 | 100 | 6.9 | 68.6 | 72.9 | 52.5 | 7.2 | 66.65 | 69.3 |
| Comparative Example 36 | 100 | 9.7 | 92.7 | 79.2 | 58.2 | 6.9 | 59.47 | 66.8 |
| Comparative Example 37 | 100 | 13.0 | 99.0 | 81.6 | 50.0 | 9.6 | 51.00 | 60.6 |
| Comparative Example 38 | 100 | 13.0 | 92.7 | 79.4 | 15.0 | 32.1 | 10.21 | 64.0 |
| Comparative Example 39 | 100 | 13.0 | 95.5 | 79.7 | 16.4 | 28.3 | 12.21 | 63.3 |
| Comparative Example 40 | 100 | 13.0 | 99.0 | 80.7 | 15.4 | 25.1 | 15.21 | 65.2 |
| Comparative Example 41 | 100 | 13.0 | 92.8 | 79.7 | 6.1 | 60.2 | 0.40 | 65.2 |
| Comparative Example 42 | 100 | 0.9 | 28.3 | 49.2 | 8.2 | 37.6 | 54.76 | 62.6 |
| Comparative Example 43 | 100 | 0.9 | 31.7 | 53.4 | 8.4 | 38.0 | 67.29 | 64.0 |
| Comparative Example 44 | 100 | 13.0 | 92.9 | 80.2 | 6.5 | 40.5 | 0.30 | 65.8 |
| Comparative Example 45 | 100 | 0.9 | 34.3 | 54.0 | 9.8 | 35.8 | 68.92 | 62.6 |
| Comparative Example 46 | 100 | 13.0 | 98.3 | 80.0 | 7.1 | 42.0 | 10.30 | 61.6 |

TABLE 5

| | Oxide particle preparation step | | Fibrous organic substance or organic substance | | | |
|---|---|---|---|---|---|---|
| | Stirring treatment Treatment time (min) | Metal oxide particle Particle size (50% cumulative size on volume basis) [µm] | Type of raw material | Average fiber diameter or average diameter [µm] | Average aspect ratio | Amount mixed (parts by mass) |
| Comparative Example 47 | 45 | 0.7 | Rod-like cellulose | 30.0 | 3 | 1.0 |
| Comparative Example 48 | 31 | 1.9 | Rod-like cellulose | 30.0 | 3 | 1.0 |
| Comparative Example 49 | 24 | 3.2 | Rod-like cellulose | 30.0 | 3 | 1.0 |
| Comparative Example 50 | 12 | 6.4 | Rod-like cellulose | 30.0 | 3 | 1.0 |
| Comparative Example 51 | 3 | 9.5 | Rod-like cellulose | 30.0 | 3 | 1.0 |
| Comparative Example 52 | 3 | 12.0 | Rod-like cellulose | 30.0 | 3 | 1.0 |
| Comparative Example 53 | 45 | 0.7 | Rod-like cellulose | 30.0 | 3 | 2.0 |
| Comparative Example 54 | 24 | 3.2 | Rod-like cellulose | 30.0 | 3 | 2.0 |
| Comparative Example 55 | 16 | 4.6 | Rod-like cellulose | 30.0 | 3 | 2.0 |
| Comparative Example 56 | 12 | 6.4 | Rod-like cellulose | 30.0 | 3 | 2.0 |
| Comparative Example 57 | 5 | 9.5 | Rod-like cellulose | 30.0 | 3 | 2.0 |
| Comparative Example 58 | 45 | 0.7 | Rod-like cellulose | 30.0 | 3 | 3.0 |
| Comparative Example 59 | 31 | 1.9 | Rod-like cellulose | 30.0 | 3 | 3.0 |
| Comparative Example 60 | 24 | 3.2 | Rod-like cellulose | 30.0 | 3 | 3.0 |
| Comparative Example 61 | 12 | 6.4 | Rod-like cellulose | 30.0 | 3 | 3.0 |
| Comparative Example 62 | 5 | 9.5 | Rod-like cellulose | 30.0 | 3 | 3.0 |
| Comparative Example 63 | 3 | 12.0 | Rod-like cellulose | 30.0 | 3 | 3.0 |
| Comparative Example 64 | 45 | 0.7 | Rod-like cellulose | 30.0 | 3 | 5.0 |

TABLE 5-continued

| | | | | | | | |
|---|---|---|---|---|---|---|---|
| Comparative Example 65 | 31 | 1.9 | Rod-like cellulose | 30.0 | 3 | 5.0 | |
| Comparative Example 66 | 24 | 3.2 | Rod-like cellulose | 30.0 | 3 | 5.0 | |
| Comparative Example 67 | 16 | 4.6 | Rod-like cellulose | 30.0 | 3 | 5.0 | |
| Comparative Example 68 | 12 | 6.4 | Rod-like cellulose | 30.0 | 3 | 5.0 | |
| Comparative Example 69 | 5 | 9.5 | Rod-like cellulose | 30.0 | 3 | 5.0 | |

| | Catalyst coating layer | | | | | | |
|---|---|---|---|---|---|---|---|
| | | Particle size of catalyst particle (15% cumulative size on cross-sectional area basis) [μm] | Average thickness [μm] | Porosity (% by volume) | High-aspect-ratio pore | | Catalyst performance NOx conversion efficiency [%] |
| | Amount of coating [g/L] | | | | Average aspect ratio | Orientation angle (degrees) | Rate relative to whole of voids (% by volume) | |
| Comparative Example 47 | 100 | 0.7 | 18.9 | 40.0 | 5.1 | 83.0 | 0.02 | 62.3 |
| Comparative Example 48 | 100 | 1.9 | 21.5 | 43.4 | 5.2 | 71.0 | 0.02 | 65.7 |
| Comparative Example 49 | 100 | 3.2 | 29.5 | 50.3 | 5.5 | 74.0 | 0.04 | 71.0 |
| Comparative Example 50 | 100 | 6.4 | 65.8 | 72.1 | 5.9 | 61.0 | 0.07 | 72.9 |
| Comparative Example 51 | 100 | 9.5 | 83.7 | 76.6 | 5.7 | 63.0 | 0.09 | 67.7 |
| Comparative Example 52 | 100 | 12.0 | 91.5 | 79.9 | 6.1 | 69.0 | 0.11 | 63.5 |
| Comparative Example 53 | 100 | 0.7 | 26.5 | 48.0 | 5.0 | 81.0 | 0.01 | 62.7 |
| Comparative Example 54 | 100 | 3.2 | 37.8 | 56.8 | 5.5 | 83.0 | 0.04 | 69.8 |
| Comparative Example 55 | 100 | 4.6 | 57.0 | 67.8 | 5.7 | 74.0 | 0.06 | 78.7 |
| Comparative Example 56 | 100 | 6.4 | 73.5 | 73.8 | 5.8 | 78.0 | 0.08 | 71.4 |
| Comparative Example 57 | 100 | 9.5 | 90.6 | 78.9 | 5.7 | 60.0 | 0.10 | 52.8 |
| Comparative Example 58 | 100 | 0.7 | 33.6 | 54.7 | 5.0 | 60.0 | 0.02 | 65.4 |
| Comparative Example 59 | 100 | 1.9 | 34.0 | 54.7 | 5.2 | 63.0 | 0.02 | 69.3 |
| Comparative Example 60 | 100 | 3.2 | 47.0 | 62.7 | 5.5 | 81.0 | 0.04 | 71.3 |
| Comparative Example 61 | 100 | 6.4 | 82.5 | 76.1 | 5.8 | 85.0 | 0.09 | 56.2 |
| Comparative Example 62 | 100 | 9.5 | 96.5 | 80.4 | 5.7 | 62.0 | 0.09 | 53.0 |
| Comparative Example 63 | 100 | 12.0 | 114.7 | 84.3 | 6.1 | 78.0 | 0.12 | 59.4 |
| Comparative Example 64 | 100 | 0.7 | 42.6 | 59.9 | 5.1 | 69.0 | 0.01 | 61.0 |
| Comparative Example 65 | 100 | 1.9 | 47.4 | 63.4 | 5.2 | 63.0 | 0.03 | 65.3 |
| Comparative Example 66 | 100 | 3.2 | 52.5 | 65.7 | 5.6 | 79.0 | 0.04 | 55.2 |
| Comparative Example 67 | 100 | 4.6 | 74.0 | 74.1 | 5.7 | 67.0 | 0.06 | 74.0 |
| Comparative Example 68 | 100 | 6.4 | 89.1 | 78.5 | 5.9 | 79.0 | 0.09 | 56.8 |
| Comparative Example 69 | 100 | 9.5 | 105.5 | 82.3 | 5.7 | 80.0 | 0.10 | 53.4 |

TABLE 6

| | Oxide particle preparation step | | Fibrous organic substance or organic substance | | | |
|---|---|---|---|---|---|---|
| | Stirring treatment Treatment time (min) | Metal oxide particle Particle size (50% cumulative size on volume basis) [μm] | Type of raw material | Average fiber diameter or average diameter [μm] | Average aspect ratio | Amount mixed (parts by mass) |
| Comparative Example 70 | 3 | 12.0 | Rod-like cellulose | 30.0 | 3 | 5.0 |
| Comparative Example 71 | 45 | 0.7 | Rod-like cellulose | 30.0 | 3 | 7.0 |
| Comparative Example 72 | 24 | 3.2 | Rod-like cellulose | 30.0 | 3 | 7.0 |
| Comparative Example 73 | 16 | 4.6 | Rod-like cellulose | 30.0 | 3 | 7.0 |
| Comparative Example 74 | 12 | 6.4 | Rod-like cellulose | 30.0 | 3 | 7.0 |
| Comparative Example 75 | 45 | 0.7 | Pulverized cellulose | 1.0 | 3 | 1.0 |
| Comparative Example 76 | 31 | 1.9 | Pulverized cellulose | 1.0 | 3 | 1.0 |
| Comparative Example 77 | 24 | 3.2 | Pulverized cellulose | 1.0 | 3 | 1.0 |
| Comparative Example 78 | 16 | 4.6 | Pulverized cellulose | 1.0 | 3 | 1.0 |
| Comparative Example 79 | 12 | 6.4 | Pulverized cellulose | 1.0 | 3 | 1.0 |
| Comparative Example 80 | 5 | 9.5 | Pulverized cellulose | 1.0 | 3 | 1.0 |
| Comparative Example 81 | 3 | 12.0 | Pulverized cellulose | 1.0 | 3 | 1.0 |

TABLE 6-continued

| | Stirring treatment Treatment time (min) | Metal oxide particle Particle size (50% cumulative size on volume basis) [μm] | Type of raw material | Average fiber diameter or average diameter [μm] | Average aspect ratio | Amount mixed (parts by mass) |
|---|---|---|---|---|---|---|
| Comparative Example 82 | 45 | 0.7 | Pulverized cellulose | 1.0 | 3 | 2.0 |
| Comparative Example 83 | 24 | 3.2 | Pulverized cellulose | 1.0 | 3 | 2.0 |
| Comparative Example 84 | 12 | 6.4 | Pulverized cellulose | 1.0 | 3 | 2.0 |
| Comparative Example 85 | 5 | 9.5 | Pulverized cellulose | 1.0 | 3 | 2.0 |
| Comparative Example 86 | 45 | 0.7 | Pulverized cellulose | 1.0 | 3 | 3.0 |
| Comparative Example 87 | 31 | 1.9 | Pulverized cellulose | 1.0 | 3 | 3.0 |
| Comparative Example 88 | 24 | 3.2 | Pulverized cellulose | 1.0 | 3 | 3.0 |
| Comparative Example 89 | 16 | 4.6 | Pulverized cellulose | 1.0 | 3 | 3.0 |
| Comparative Example 90 | 12 | 6.4 | Pulverized cellulose | 1.0 | 3 | 3.0 |
| Comparative Example 91 | 5 | 9.5 | Pulverized cellulose | 1.0 | 3 | 3.0 |
| Comparative Example 92 | 3 | 12.0 | Pulverized cellulose | 1.0 | 3 | 3.0 |

| | Catalyst coating layer | | | | High-aspect-ratio pore | | | |
|---|---|---|---|---|---|---|---|---|
| | Amount of coating [g/L] | Particle size of catalyst particle (15% cumulative size on cross-sectional area basis) [μm] | Average thickness [μm] | Porosity (% by volume) | Average aspect ratio | Orientation angle (degrees) | Rate relative to whole of voids (% by volume) | Catalyst performance NOx conversion efficiency [%] |
| Comparative Example 70 | 100 | 12.0 | 118.6 | 85.0 | 6.0 | 72.0 | 0.12 | 58.0 |
| Comparative Example 71 | 100 | 0.7 | 47.1 | 63.1 | 5.1 | 76.0 | 0.02 | 60.5 |
| Comparative Example 72 | 100 | 3.2 | 57.7 | 68.8 | 5.5 | 79.0 | 0.05 | 54.4 |
| Comparative Example 73 | 100 | 4.6 | 79.0 | 74.9 | 5.6 | 81.0 | 0.07 | 70.8 |
| Comparative Example 74 | 100 | 6.4 | 86.9 | 78.2 | 5.9 | 60.0 | 0.08 | 56.1 |
| Comparative Example 75 | 100 | 0.7 | 20.4 | 41.2 | 5.4 | 84.0 | 0.01 | 67.4 |
| Comparative Example 76 | 100 | 1.9 | 21.7 | 43.3 | 5.4 | 82.0 | 0.02 | 68.3 |
| Comparative Example 77 | 100 | 3.2 | 30.7 | 52.3 | 6.0 | 84.0 | 0.05 | 76.9 |
| Comparative Example 78 | 100 | 4.6 | 52.4 | 66.2 | 5.6 | 60.0 | 0.06 | 73.7 |
| Comparative Example 79 | 100 | 6.4 | 64.0 | 70.1 | 6.0 | 63.0 | 0.08 | 73.1 |
| Comparative Example 80 | 100 | 9.5 | 82.0 | 77.0 | 5.7 | 76.0 | 0.10 | 72.4 |
| Comparative Example 81 | 100 | 12.0 | 92.4 | 79.5 | 6.3 | 62.0 | 0.11 | 63.2 |
| Comparative Example 82 | 100 | 0.7 | 27.9 | 49.6 | 5.0 | 69.0 | 0.01 | 78.1 |
| Comparative Example 83 | 100 | 3.2 | 31.7 | 52.2 | 5.6 | 83.0 | 0.05 | 78.2 |
| Comparative Example 84 | 100 | 6.4 | 68.8 | 73.2 | 5.9 | 76.0 | 0.09 | 73.5 |
| Comparative Example 85 | 100 | 9.5 | 85.2 | 78.3 | 6.1 | 70.0 | 0.10 | 72.4 |
| Comparative Example 86 | 100 | 0.7 | 49.4 | 63.6 | 5.0 | 78.0 | 0.01 | 78.9 |
| Comparative Example 87 | 100 | 1.9 | 33.8 | 54.1 | 5.4 | 64.0 | 0.03 | 73.4 |
| Comparative Example 88 | 100 | 3.2 | 36.6 | 56.3 | 5.7 | 67.0 | 0.05 | 75.1 |
| Comparative Example 89 | 100 | 4.6 | 54.5 | 66.2 | 6.1 | 77.0 | 0.06 | 72.6 |
| Comparative Example 90 | 100 | 6.4 | 70.7 | 72.9 | 6.1 | 68.0 | 0.08 | 73.2 |
| Comparative Example 91 | 100 | 9.5 | 88.3 | 78.8 | 6.2 | 77.0 | 0.09 | 70.6 |
| Comparative Example 92 | 100 | 12.0 | 97.9 | 81.0 | 6.1 | 80.0 | 0.11 | 63.3 |

TABLE 7

| | Oxide particle preparation step | | Fibrous organic substance or organic substance | | | |
|---|---|---|---|---|---|---|
| | Stirring treatment Treatment time (min) | Metal oxide particle Particle size (50% cumulative size on volume basis) [μm] | Type of raw material | Average fiber diameter or average diameter [μm] | Average aspect ratio | Amount mixed (parts by mass) |
| Comparative Example 93 | 45 | 0.7 | Rod-like cellulose | 30.0 | 3 | 5.0 |
| Comparative Example 94 | 24 | 3.2 | Pulverized cellulose | 1.0 | 3 | 5.0 |
| Comparative Example 95 | 16 | 4.6 | Pulverized cellulose | 1.0 | 3 | 5.0 |
| Comparative Example 96 | 45 | 0.7 | Pulverized cellulose | 1.0 | 3 | 7.0 |
| Comparative Example 97 | 31 | 1.9 | Pulverized cellulose | 1.0 | 3 | 7.0 |
| Comparative Example 98 | 24 | 3.2 | Pulverized cellulose | 1.0 | 3 | 7.0 |

TABLE 7-continued

| | | | | | | |
|---|---|---|---|---|---|---|
| Comparative Example 99 | 16 | 6.4 | Pulverized cellulose | 1.0 | 3 | 7.0 |
| Comparative Example 100 | 5 | 9.5 | Pulverized cellulose | 1.0 | 3 | 7.0 |
| Comparative Example 101 | 3 | 12.0 | Pulverized cellulose | 1.0 | 3 | 7.0 |
| Comparative Example 102 | 45 | 0.7 | PMMA particle | 3.0 | — | 1.0 |
| Comparative Example 103 | 31 | 1.9 | PMMA particle | 3.0 | — | 1.0 |
| Comparative Example 104 | 24 | 3.2 | PMMA particle | 3.0 | — | 1.0 |
| Comparative Example 105 | 16 | 4.6 | PMMA particle | 3.0 | — | 1.0 |
| Comparative Example 106 | 12 | 6.4 | PMMA particle | 3.0 | — | 1.0 |
| Comparative Example 107 | 5 | 9.5 | PMMA particle | 3.0 | — | 1.0 |
| Comparative Example 108 | 3 | 12.0 | PMMA particle | 3.0 | — | 1.0 |
| Comparative Example 109 | 45 | 0.7 | PMMA particle | 3.0 | — | 2.0 |
| Comparative Example 110 | 24 | 3.2 | PMMA particle | 3.0 | — | 2.0 |
| Comparative Example 111 | 12 | 6.4 | PMMA particle | 3.0 | — | 2.0 |
| Comparative Example 112 | 45 | 0.7 | PMMA particle | 3.0 | — | 3.0 |
| Comparative Example 113 | 24 | 3.2 | PMMA particle | 3.0 | — | 3.0 |
| Comparative Example 114 | 16 | 4.6 | PMMA particle | 3.0 | — | 3.0 |
| Comparative Example 115 | 12 | 6.4 | PMMA particle | 3.0 | — | 3.0 |

| | Catalyst coating layer | | | | | | | |
|---|---|---|---|---|---|---|---|---|
| | Amount of coating [g/L] | Particle size of catalyst particle (15% cumulative size on cross-sectional area basis) [μm] | Average thickness [μm] | Porosity (% by volume) | High-aspect-ratio pore | | | Catalyst performance NOx conversion effciency [%] |
| | | | | | Average aspect ratio | Orientation angle (degrees) | Rate relative to whole of voids (% by volume) | |
| Comparative Example 93 | 100 | 0.7 | 56.4 | 67.1 | 5.4 | 77.0 | 0.02 | 78.7 |
| Comparative Example 94 | 100 | 3.2 | 40.5 | 59.5 | 5.5 | 73.0 | 0.04 | 75.1 |
| Comparative Example 95 | 100 | 4.6 | 64.4 | 71.1 | 5.8 | 63.0 | 0.06 | 71.8 |
| Comparative Example 96 | 100 | 0.7 | 64.4 | 71.1 | 5.1 | 80.0 | 0.01 | 73.3 |
| Comparative Example 97 | 100 | 1.9 | 56.6 | 67.8 | 5.5 | 80.0 | 0.02 | 68.3 |
| Comparative Example 98 | 100 | 3.2 | 52.2 | 65.1 | 5.6 | 68.0 | 0.05 | 71.4 |
| Comparative Example 99 | 100 | 6.4 | 69.1 | 72.0 | 6.7 | 80.0 | 0.08 | 69.3 |
| Comparative Example 100 | 100 | 9.5 | 94.8 | 80.5 | 6.5 | 70.0 | 0.10 | 67.6 |
| Comparative Example 101 | 100 | 12.0 | 93.4 | 79.7 | 6.1 | 71.0 | 0.12 | 63.2 |
| Comparative Example 102 | 100 | 0.7 | 20.6 | 42.1 | 5.1 | 81.0 | 0.02 | 61.4 |
| Comparative Example 103 | 100 | 1.9 | 21.2 | 43.1 | 5.2 | 80.0 | 0.03 | 67.0 |
| Comparative Example 104 | 100 | 3.2 | 28.7 | 50.7 | 5.5 | 79.0 | 0.05 | 76.0 |
| Comparative Example 105 | 100 | 4.6 | 52.7 | 66.0 | 5.6 | 73.0 | 0.07 | 75.1 |
| Comparative Example 106 | 100 | 6.4 | 63.9 | 71.2 | 5.8 | 74.0 | 0.08 | 71.6 |
| Comparative Example 107 | 100 | 9.5 | 77.3 | 75.0 | 5.8 | 83.0 | 0.09 | 69.3 |
| Comparative Example 108 | 100 | 12.0 | 89.2 | 77.7 | 6.0 | 62.0 | 0.11 | 62.8 |
| Comparative Example 109 | 100 | 0.7 | 24.1 | 46.8 | 5.1 | 75.0 | 0.01 | 63.7 |
| Comparative Example 110 | 100 | 3.2 | 30.3 | 52.2 | 5.6 | 78.0 | 0.05 | 75.1 |
| Comparative Example 111 | 100 | 6.4 | 63.1 | 70.8 | 5.8 | 81.0 | 0.08 | 71.1 |
| Comparative Example 112 | 100 | 0.7 | 23.8 | 46.1 | 5.1 | 81.0 | 0.02 | 65.3 |
| Comparative Example 113 | 100 | 3.2 | 33.7 | 54.0 | 5.6 | 62.0 | 0.06 | 77.1 |
| Comparative Example 114 | 100 | 4.6 | 52.4 | 65.2 | 5.6 | 65.0 | 0.06 | 74.1 |
| Comparative Example 115 | 100 | 6.4 | 65.5 | 70.5 | 5.9 | 77.0 | 0.08 | 73.4 |

TABLE 8

| | Oxide particle preparation step | | Fibrous organic substance or organic substance | | | |
|---|---|---|---|---|---|---|
| | Stirring treatment Treatment time (min) | Metal oxide particle Particle size (50% cumulative size on volume basis) [μm] | Type of raw material | Average fiber diameter or average diameter [μm] | Average aspect ratio | Amount mixed (parts by mass) |
| Comparative Example 116 | 5 | 9.5 | PMMA particle | 3.0 | — | 3.0 |
| Comparative Example 117 | 45 | 0.7 | PMMA particle | 3.0 | — | 5.0 |
| Comparative Example 118 | 31 | 1.9 | PMMA particle | 3.0 | — | 5.0 |
| Comparative Example 119 | 16 | 4.6 | PMMA particle | 3.0 | — | 5.0 |
| Comparative Example 120 | 5 | 9.5 | PMMA particle | 3.0 | — | 5.0 |
| Comparative Example 121 | 3 | 12.0 | PMMA particle | 3.0 | — | 5.0 |
| Comparative Example 122 | 31 | 1.9 | PMMA particle | 3.0 | — | 7.0 |
| Comparative Example 123 | 24 | 3.2 | PMMA particle | 3.0 | — | 7.0 |
| Comparative Example 124 | 12 | 6.4 | PMMA particle | 3.0 | — | 7.0 |
| Comparative Example 125 | 5 | 9.5 | PMMA particle | 3.0 | — | 7.0 |
| Combarative Example 126 | 3 | 12.0 | PMMA particle | 3.0 | — | 7.0 |
| Comparative Example 127 | 31 | 1.9 | PMMA particle + TiOPr + PEG | 3.0 | 11 | 1.0 |
| Comparative Example 128 | 3 | 12.0 | PMMA particle + TiOPr + PEG | 3.0 | 11 | 1.0 |
| Comparative Example 129 | 12 | 6.4 | PMMA particle + TiOPr + PEG | 3.0 | 11 | 2.0 |
| Comparative Example 130 | 3 | 12.0 | PMMA particle + TiOPr + PEG | 3.0 | 11 | 1.0 |
| Comparative Example 131 | 3 | 12.0 | PMMA particle + TiOPr + PEG | 3.0 | 11 | 7.0 |
| Comparative Example 132 | 16 | 4.6 | PET fiber | 2.0 | 40 | 3.0 |
| Comparative Example 133 | 16 | 4.6 | PET fiber | 2.0 | 40 | 3.0 |

| | Catalyst coating layer | | | | High-aspect-ratio pore | | | |
|---|---|---|---|---|---|---|---|---|
| | Amount of coating [g/L] | Particle size of catalyst particle (15% cumulative size on cross-sectional area basis) [μm] | Average thickness [μm] | Porosity (% by volume) | Average aspect ratio | Orientation angle (degrees) | Rate relative to whole of voids (% by volume) | Catalyst performance NOx conversion effciency [%] |
| Comparative Example 116 | 100 | 9.5 | 86.4 | 77.5 | 5.8 | 69.0 | 0.09 | 69.5 |
| Comparative Example 117 | 100 | 0.7 | 25.9 | 47.2 | 5.1 | 65.0 | 0.01 | 67.1 |
| Comparative Example 118 | 100 | 1.9 | 27.7 | 49.0 | 5.2 | 68.0 | 0.02 | 72.7 |
| Comparative Example 119 | 100 | 4.6 | 56.8 | 66.4 | 5.7 | 74.0 | 0.06 | 57.8 |
| Comparative Example 120 | 100 | 9.5 | 84.2 | 78.0 | 5.7 | 70.0 | 0.12 | 67.5 |
| Comparative Example 121 | 100 | 12.0 | 95.0 | 80.1 | 6.0 | 73.0 | 0.12 | 63.8 |
| Comparative Example 122 | 100 | 1.9 | 30.3 | 52.3 | 5.2 | 81.0 | 0.02 | 71.7 |
| Comparative Example 123 | 100 | 3.2 | 37.1 | 57.3 | 5.6 | 60.0 | 0.05 | 78.2 |
| Comparative Example 124 | 100 | 6.4 | 69.2 | 72.7 | 5.9 | 85.0 | 0.09 | 68.0 |
| Comparative Example 125 | 100 | 9.5 | 85.9 | 77.0 | 5.8 | 79.0 | 0.10 | 63.8 |
| Comparative Example 126 | 100 | 12.0 | 97.6 | 80.2 | 6.0 | 85.0 | 0.11 | 59.9 |
| Comparative Example 127 | 100 | 1.9 | 21.6 | 45.0 | 5.5 | 46.9 | 0.37 | 69.8 |
| Comparative Example 128 | 100 | 12.0 | 92.3 | 79.4 | 5.1 | 69.0 | 0.20 | 62.3 |
| Comparative Example 129 | 100 | 6.4 | 63.2 | 69.8 | 8.9 | 47.0 | 0.42 | 73.5 |
| Comparative Example 130 | 100 | 12.0 | 98.6 | 80.1 | 6.1 | 65.0 | 0.51 | 69.1 |
| Comparative Example 131 | 100 | 12.0 | 93.9 | 79.2 | 5.4 | 42.0 | 0.41 | 79.0 |
| Comparative Example 132 | 30 | 4.6 | 22.0 | 66.9 | 41.1 | 20.1 | 32.21 | 75.0 |
| Comparative Example 133 | 400 | 4.6 | 181.6 | 70.4 | 43.6 | 26.4 | 46.10 | 72.0 |

The exhaust gas purification catalyst (catalyst sample) obtained in each of Examples 1 to 42 and the comparative exhaust gas purification catalyst (comparative catalyst sample) obtained in each of Comparative Examples 1 to 133 were subjected to measurements of the average thickness [μm] of the catalyst coating layer, the particle size of the catalyst particle (15% cumulative size on cross-sectional area basis) [μm], the porosity [% by volume] of the catalyst coating layer, the average aspect ratio of the high-aspect-ratio pore, the rate [%] of the high-aspect-ratio pore relative to the whole of a void, and the orientation angle [degrees (°)] of the high-aspect-ratio pore (80% cumulative angle).

(1) Measurement Test of Average Thickness of Catalyst Coating Layer

Each of the catalyst sample and the comparative catalyst sample was embedded with an epoxy resin and cut out in a radial direction of the substrate (honeycomb-shaped substrate), and the resulting cross section was polished. The resultant was subjected to scanning electron microscope (SEM) observation (magnification: 700-fold) to measure the average thickness of the catalyst coating layer. Herein, the average thickness was determined by randomly extracting 10 points on the catalyst coating layer, and measuring the thickness of the catalyst coating layer at such points to provide an average value. The results obtained are shown in Table 1 to Table 8.

(2) Measurement Test of Particle Size of Catalyst Particle

Each of the catalyst sample and the comparative catalyst sample was embedded with an epoxy resin and cut out in a radial direction of the substrate (honeycomb-shaped substrate), and the resulting cross section was polished. The resultant was subjected to scanning electron microscope (SEM) observation (magnification: 700-fold) to determine the 15% cumulative size in a cumulative particle size distribution on a cross-sectional area basis of the catalyst particle. Herein, the 15% cumulative size of the particle size of catalyst particle on a cross-sectional area basis was determined as follows: the catalyst particles in a square region of 200 μm or more in a horizontal direction to a substrate flat portion of the catalyst coating layer and 25 μm or more in a perpendicular direction to the substrate flat portion were extracted: and the particle size of the catalyst particle was measured which corresponded to the particle size at 15% in terms of frequency relative to the whole of the cross-sectional area of the catalyst coating layer when the cross-sectional area of the catalyst particle was cumulated from the largest catalyst particle size (cross-sectional area) of the catalyst particle in the descending order, provided that any pore where the sum of the cross-sectional area of the catalyst particle was less than 0.3 mm$^2$ was excluded. The results obtained are shown in Table 1 to Table 8.

(3) Measurement Test of Porosity of Catalyst Coating Layer

The porosity of the catalyst sample was measured based on the following expression by a weight-in-water method, according to JIS R 2205. Herein, deairing was performed by vacuum deairing.

Porosity (% by volume)=(W3−W1)/(W3−W2)×100

W1: dry mass (120° C.×60 minutes)
W2: mass in water
W3: mass in saturation with water The results obtained are shown in Table 1 to Table 8.

(4) Measurement Test 1 of Pore in Catalyst Coating Layer: Equivalent Circle Diameter of Pore The pore in the catalyst coating layer of each of the catalyst sample and the comparative catalyst sample was subjected to FIB-SEM analysis.

Figure 2:
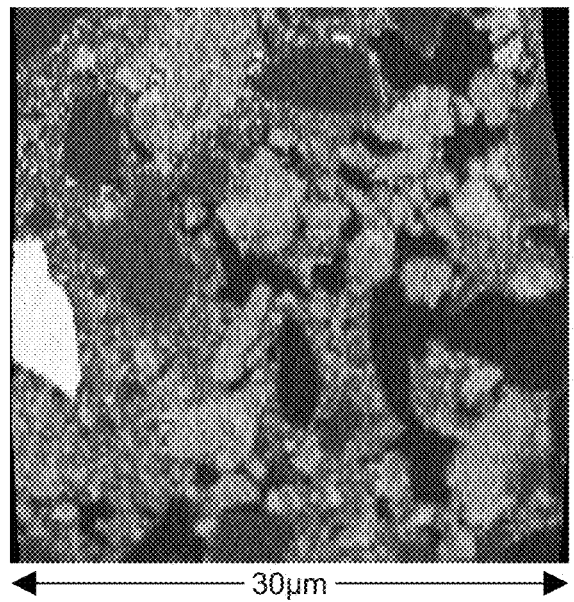
FIG. 2 is a scanning electron micrograph (SEM photograph) of a catalyst coating layer cross section perpendicular to an exhaust gas flow direction on the substrate of an exhaust gas purification catalyst obtained in Example 5 of Test 1.

First, each of the catalyst sample and the comparative catalyst sample was cut out in an axial direction at the position of a dotted line illustrated in FIG. 1(A), to provide a test piece having a shape illustrated in FIG. 2(B). Next, while a range of the test piece, indicated by a dotted line of a square frame in FIG. 1(B), was cut by FIB (focused ion beam machining apparatus, manufactured by Hitachi High-Technologies Corporation, trade name "NB5000"), a SEM (scanning electron microscope, manufactured by Hitachi High-Technologies Corporation, trade name "NB5000") image was taken in a pitch of 0.28 μm in a depth illustrated in FIG. 1(C). Herein, FIB-SEM analysis conditions were as follows: the length was 25 μm or more, the width was 500 μm or more, the depth in measurement was 500 μm or more, the number of views in imaging was 3 or more, and the imaging magnification was 2000-fold in the SEM image. FIG. 1 includes schematic diagrams illustrating one example of a FIB-SEM measurement method. FIG. 1(A) is a schematic diagram illustrating a part of a catalyst coating layer cross section perpendicular to an exhaust gas flow direction of the substrate of the exhaust gas purification catalyst of the present invention, FIG. 1(B) is a schematic diagram illustrating a test piece obtained by cutting the exhaust gas purification catalyst in an axial direction at the position of a dotted line illustrated in FIG. 1(A), and FIG. 1(C) schematically represents an SEM image obtained by a FIB-SEM measurement method. FIG. 2 illustrates one continuous cross-sectional SEM image of the catalyst sample in Example 5 subjected to measurement, as one example of the observation results of FIB-SEM analysis. A black portion in FIG. 2 represents a pore. FIG. 2 illustrates a scanning electron micrograph (SEM photograph) of a catalyst coating layer cross section perpendicular to an exhaust gas flow direction of the substrate of the exhaust gas purification catalyst obtained in Example 5. Herein, a continuous image as illustrated in FIG. 1(c) can be taken by X-ray CT or the like.

Figure 3:
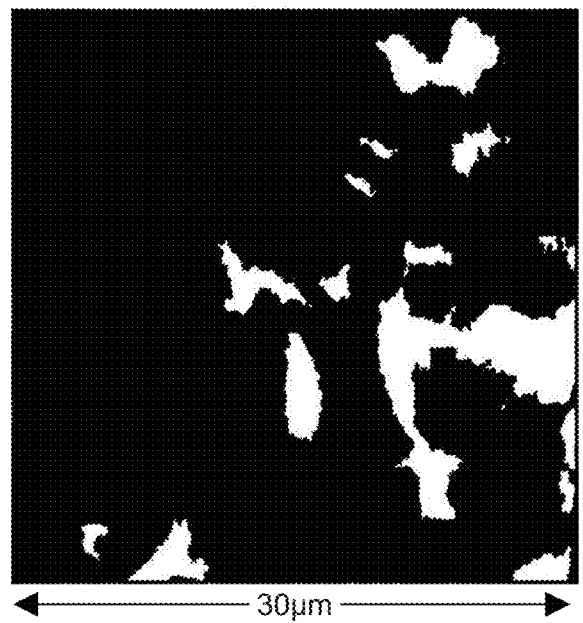
FIG. 3 is a diagram obtained by binarization processing of the SEM photograph in FIG. 2.

Next, the continuous cross-sectional image (SEM image) obtained by FIB-SEM analysis was subjected to image analysis using commercially available image analysis software (manufactured by Mitani Corporation, "two-dimensional image analysis software WinROOF") by means of the difference in brightness between the pore and the catalyst, and was subjected to binarization processing to extract the pore. FIG. 3 illustrates the SEM photograph in FIG. 2, subjected to binarization processing, as one example of the results obtained. In FIG. 3, a black portion represents the catalyst, and a white portion represents the pore. In the pore analysis, a pore whose equivalent circle diameter in the cross-sectional image of a catalyst coating layer cross section perpendicular to an exhaust gas flow direction of the substrate was 2 μm or more was analyzed. In addition, the function for extracting a subject by use of the difference in brightness is not limited to WinROOF, and such function (for example, image-Pro Plus manufactured by Planetron, Inc) on which common analysis software is normally mounted can be utilized.

The area within the profile of the pore was determined by such image analysis, the equivalent circle diameter of the pore was calculated, and the equivalent circle diameter as the particle size of the pore was obtained.

(5) Measurement Test 2 of Pore in Catalyst Coating Layer: Average Aspect Ratio of High-Aspect-Ratio Pore Next, the continuous cross-sectional image obtained by the above method was analyzed, and three-dimensional information on the pore was extracted. The measurement method of the average aspect ratio of the high-aspect-ratio pore was the same as the method described with reference to FIG. 4 and FIG. 5 described above, and the average aspect ratio of the high-aspect-ratio pore was determined by creating the two-dimensional projection diagram and the cross-sectional image of the pore exemplifying the three-dimensional information on the pore corresponding to that in FIG. 4 and FIG. 5, and analyzing a SEM image within a length of 25 μm or more, a width of 500 μm or more and a depth in measurement of 500 μm or more, of the high-aspect-ratio pore (the number of views in imaging was 3 or more, and the imaging magnification was 2000-fold). Herein, the two-dimensional projection diagram exemplifying the three-dimensional information on the pore, obtained by analyzing the continuous cross-sectional image of the catalyst coating layer cross section perpendicular to an exhaust gas flow direction of the substrate of the exhaust gas purification catalyst obtained in Example 5 was the same as the two-dimensional projection diagram exemplifying the three-dimensional information on the pore illustrated in FIG. 4. As a result, the average aspect ratio of the high-aspect-ratio pore in Example 5 was 18.9. In addition, Table 1 to Table 8 show measurement results (the average aspect ratio of the high-aspect-ratio pore) of Examples other than Example 5, and Comparative Examples.

(6) Measurement Test 3 of Pore in Catalyst Coating Layer: Rate of High-Aspect-Ratio Pore Relative to Whole of Voids Next, the rate of the high-aspect-ratio pore relative to the whole of a void was determined by dividing the porosity of the high-aspect-ratio pore by the porosity of the catalyst coating layer.

Herein, the porosity (% by volume) of the high-aspect-ratio pore was calculated by first extracting the high-aspect-ratio pore in a SEM image (the number of views in imaging was 3 or more, and the imaging magnification was 2000-fold) within a length of 25 μm or more, a width of 500 μm or more, and a depth in measurement of 500 μm or more, and calculating the volume of each pore according to the following method. In other words, the volume of the high-aspect-ratio pore was calculated by multiplying a pitch of the continuous cross-sectional image, of 0.28 μm, with the area of the cross section of the high-aspect-ratio pore in the cross-sectional image obtained by FIB-SEM, and integrating such a product. Next, the resulting "volume of the high-aspect-ratio pore" was divided by the volume of the range subjected to imaging by FIB-SEM (the SEM image range), thereby providing the porosity (% by volume) of the high-aspect-ratio pore.

Next, the rate (% by volume) of the high-aspect-ratio pore relative to the whole of a void was determined by dividing the porosity (% by volume) of the resulting high-aspect-ratio pore by the porosity (% by volume) of the catalyst coating layer obtained in the "Measurement test of porosity of catalyst coating layer" ("Rate of high-aspect-ratio pore relative to whole of voids (%)"="porosity of high-aspect-ratio pore (% by volume)"/"porosity of catalyst coating layer (% by volume)"×100).

As a result, the rate of the high-aspect-ratio pore relative to the whole of a void in Example 5 was 11.1% by volume. In addition. Table 1 to Table 8 show measurement results (the rate of the high-aspect-ratio pore relative to the whole of a void) of Examples other than Example 5, and Comparative Examples.

(7) Measurement Test 4 of Pore in Catalyst Coating Layer: Orientation Angle of High-Aspect-Ratio Pore Next, the 80% cumulative angle, in a cumulative angle distribution on an angle basis, of the angle (cone angle) between a vector in a longitudinal direction of the high-aspect-ratio pore and a vector in an exhaust gas flow direction of the substrate was determined as the orientation angle of the high-aspect-ratio pore. Here, the measurement method of the orientation angle (80% cumulative angle) of the high-aspect-ratio pore was the same as the method with reference to FIG. 4 to FIG. 6 described above. Herein, the two-dimensional projection diagram obtained in Example 5 is the same as the two-dimensional projection diagram exemplified in FIG. 4, and FIG. 6 is the same as the schematic diagram illustrating the cone angle of the high-aspect-ratio pore in the two-dimensional projection diagram obtained in Example 5. As illustrated in the schematic diagram of FIG. 6, the angle (cone angle) between the vector (Y) in a longitudinal direction of the high-aspect-ratio pore and the vector (X) in an exhaust gas flow direction (axial direction of honeycomb) of the substrate was determined, and the 80% cumulative angle, in a cumulative angle distribution on an angle basis, of the cone angle was calculated by image analysis of the three-dimensional image. Herein, the orientation angle (80% cumulative angle) of the high-aspect-ratio pore was determined by randomly extracting 20 of the high-aspect-ratio pores, and measuring the 80% cumulative angle, in a cumulative angle distribution on an angle basis, of the cone angle of each of the high-aspect-ratio pores to provide an average value. Table 1 to Table 8 show respective results obtained (80% cumulative angle).

(8) Catalyst Performance Evaluation Test

The catalyst sample obtained in each of Examples 1 to 42 and Comparative Examples 1 to 133 was subjected to a NOx conversion efficiency measurement test as described below, and the catalyst performance of each catalyst was evaluated.

(NOx Conversion Efficiency Measurement Test)

The catalyst sample obtained in each of Examples 1 to 42 and Comparative Examples 1 to 133 was subjected to NOx conversion efficiency measurement in an atmosphere in transient variation during a transient period, as described below.

That is, a straight four-cylinder 2.4-L engine was used to perform A/F feedback control as targets of 14.1 and 15.1, first, and the NOx conversion efficiency was calculated from the average amount of NOx discharged in A/F switching. The engine operation conditions and the setup of piping were adjusted so that the intake air mass was 40 (g/sec) and the temperature of gas flowing into the catalyst was 750° C.

Figure 7:
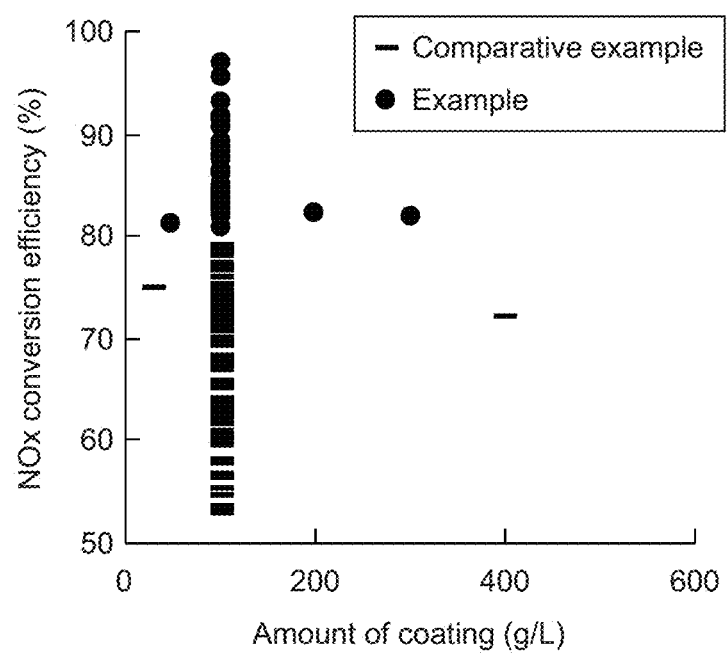
FIG. 7 is a graph representing catalyst performance evaluation test results of catalysts obtained in Examples 1 to 42 and Comparative Examples 1 to 133 of Test 1, and representing a relationship between the amount of coating of the catalyst coating layer and the NOx conversion efficiency.

3. Results (1) Relationship Between Amount of Coating of Catalyst Coating Layer and Catalyst Performance FIG. 7 illustrates a graph representing a relationship between the amount of coating of the catalyst coating layer and the NOx conversion efficiency as a graph representing catalyst performance evaluation test results of each catalyst obtained in Examples 1 to 42 and Comparative Examples 1 to 133. As is clear from comparison of the results in Examples 1 to 42 and the results in Comparative Examples 1 to 133 illustrated in FIG. 7 and represented in Table 1 to Table 8, it was confirmed that the exhaust gas purification catalyst in each of Examples 1 to 42 exhibited excellent catalyst performance in an amount of coating of the catalyst coating layer, ranging from 50 to 300 g/L, even in a region under a high load with a high flow rate of gas.

Figure 8:
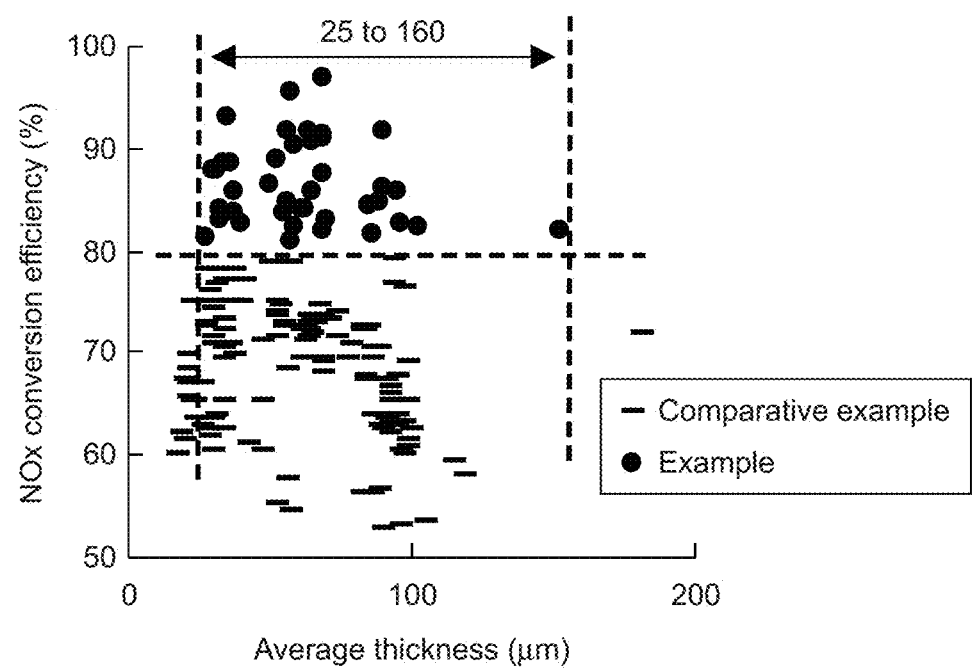
FIG. 8 is a graph representing catalyst performance evaluation test results of catalysts obtained in Examples 1 to 42 and Comparative Examples 1 to 133 of Test 1, and representing a relationship between the average thickness of the catalyst coating layer and the NOx conversion efficiency.

(2) Relationship Between Average Thickness of Catalyst Coating Layer and Catalyst Performance FIG. 8 illustrates a graph representing a relationship between the average thickness of the catalyst coating layer and the NOx conversion efficiency as a graph representing catalyst performance evaluation test results of each catalyst obtained in Examples 1 to 42 and Comparative Examples 1 to 133. As is clear from comparison of the results in Examples 1 to 42 and the results in Comparative Examples 1 to 133 illustrated in FIG. 8 and represented in Table 1 to Table 8, it was confirmed that the exhaust gas purification catalyst in each of Examples 1 to 42 exhibited excellent catalyst performance at an average thickness of the catalyst coating layer, ranging from 25 µm to 160 µm, even in a region under a high load with a high flow rate of gas.

Figure 9:
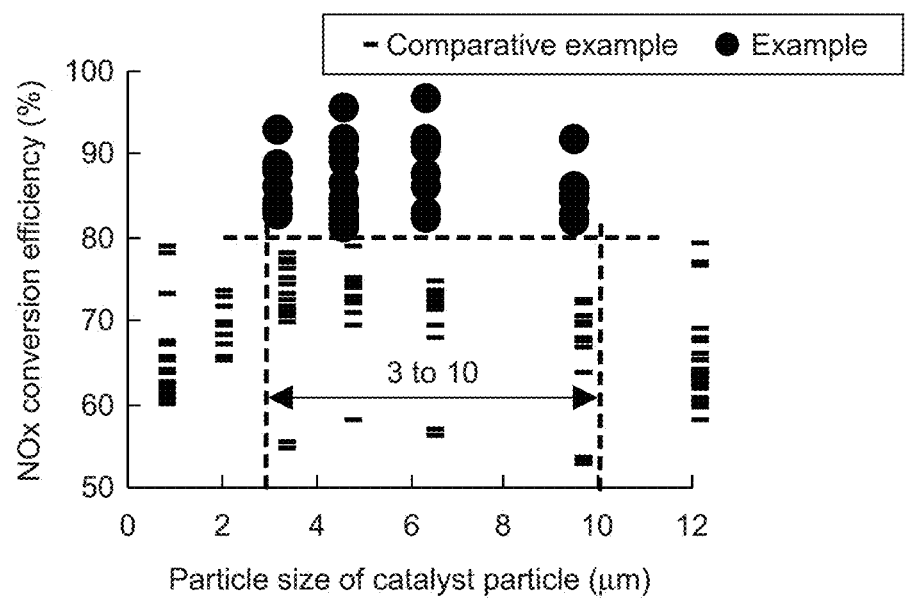
FIG. 9 is a graph representing catalyst performance evaluation test results of catalysts obtained in Examples 1 to 42 and Comparative Examples 1 to 133 of Test 1, and representing a relationship between the particle size of the catalyst particle and the NOx conversion efficiency.

(3) Relationship Between Particle Size of Catalyst Particle and Catalyst Performance FIG. 9 illustrates a graph representing a relationship between the particle size of the catalyst particle (the 15% cumulative size, in a cumulative particle size distribution on a cross-sectional area basis, of the catalyst particle) and the NOx conversion efficiency as a graph representing catalyst performance evaluation test results of each catalyst obtained in Examples 1 to 42 and Comparative Examples 1 to 133. As is clear from comparison of the results in Examples 1 to 42 and the results in Comparative Examples 1 to 133 illustrated in FIG. 9 and represented in Table 1 to Table 8, it was confirmed that the exhaust gas purification catalyst in each of Examples 1 to 42 exhibited excellent catalyst performance in a particle size of the catalyst particle (15% cumulative size on cross-sectional area basis), ranging from 3 to 10 µm, even in a region under a high load with a high flow rate of gas.

Figure 10:
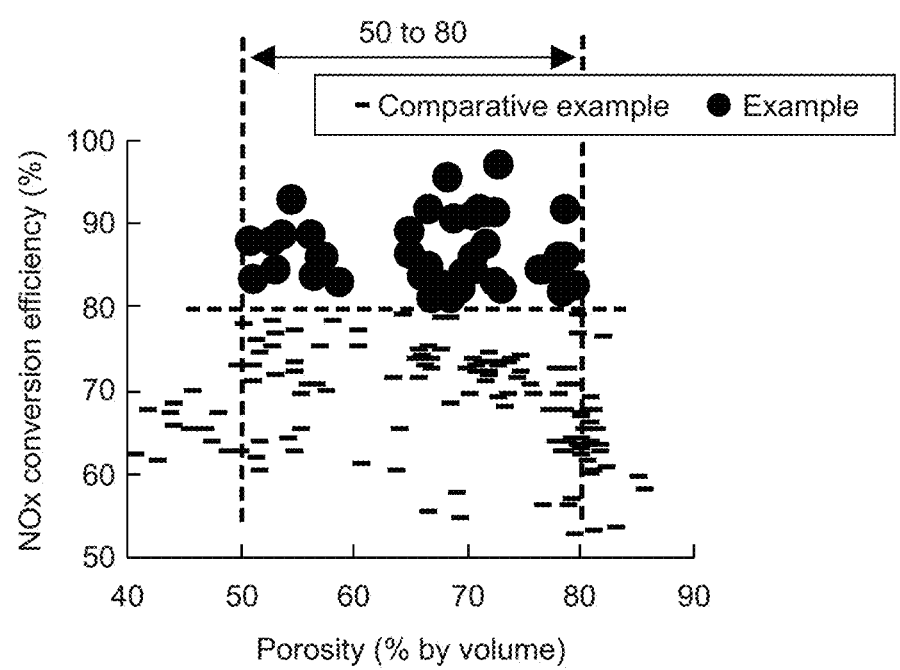
FIG. 10 is a graph representing catalyst performance evaluation test results of catalysts obtained in Examples 1 to 42 and Comparative Examples 1 to 133 of Test 1, and representing a relationship between the porosity of the catalyst coating layer and the NOx conversion efficiency.

(4) Relationship Between Porosity of Catalyst Coating Layer and Catalyst Performance FIG. 10 illustrates a graph representing a relationship between the porosity of the catalyst coating layer (the porosity measured by a weight-in-water method) and the NOx conversion efficiency as a graph representing catalyst performance evaluation test results of each catalyst obtained in Examples 1 to 42 and Comparative Examples 1 to 133. As is clear from comparison of the results in Examples 1 to 42 and the results in Comparative Examples 1 to 133 illustrated in FIG. 10 and represented in Table 1 to Table 8, it was confirmed that the exhaust gas purification catalyst in each of Examples 1 to 42 exhibited excellent catalyst performance in a porosity of the catalyst coating layer, ranging from 50 to 80% by volume, even in a region under a high load with a high flow rate of gas.

Figure 11:
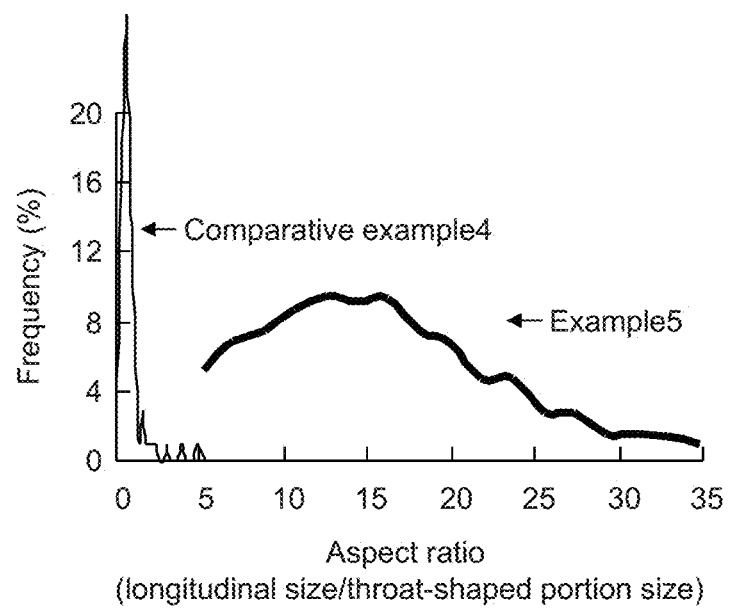
FIG. 11 is a graph representing a relationship between the aspect ratio and the frequency of the high-aspect-ratio pore of the catalyst obtained in Example 5 of Test 1, and a relationship between the aspect ratio and the frequency of the pore of the catalyst obtained in Comparative Example 4.

(5) Relationship Between Average Aspect Ratio of High-Aspect-Ratio Pore and Catalyst Performance First, FIG. 11 represents a graph representing a relationship between the aspect ratio (determined by analyzing any pore where the equivalent circle diameter of the pore in a cross-sectional image of a catalyst coating layer cross section perpendicular to an exhaust gas flow direction of the substrate was 2 µm or more, and corresponding to the aspect ratio of the high-aspect-ratio pore having an aspect ratio of 5 or more among the pores determined) and the frequency (%) of the high-aspect-ratio pore of the catalyst obtained in Example 5. Herein, FIG. 11 also represents a relationship between the aspect ratio and the frequency (%) of the pore of the catalyst obtained in Comparative Example 4. It was confirmed from comparison of the result in Example 5 and the result in Comparative Example 4 illustrated in FIG. 11 that the comparative exhaust gas purification catalyst in Comparative Example 4 was very few in the number of the high-aspect-ratio pore.

Figure 12:
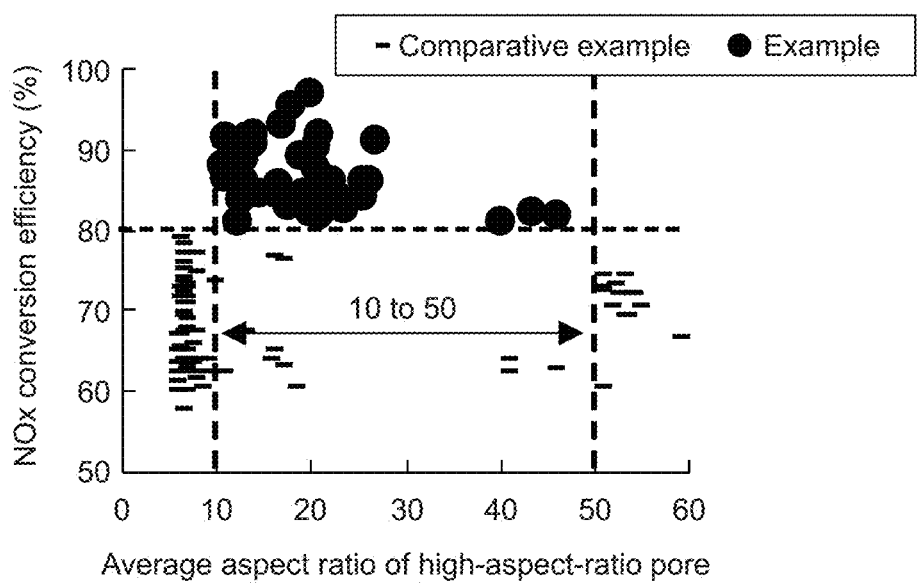
FIG. 12 is a graph representing catalyst performance evaluation test results of catalysts obtained in Examples 1 to 42 and Comparative Examples 1 to 133 of Test 1, and representing a relationship between the average aspect ratio of the high-aspect-ratio pore and the NOx conversion efficiency.

Next, FIG. 12 illustrates a graph representing a relationship between the average aspect ratio (determined by analyzing any pore where the equivalent circle diameter of the pore in a cross-sectional image of a catalyst coating layer cross section perpendicular to an exhaust gas flow direction of the substrate was 2 µm or more, and corresponding to the average aspect ratio of the high-aspect-ratio pore having an aspect ratio of 5 or more among the pores determined) and the NOx conversion efficiency of the high-aspect-ratio pore, as a graph representing catalyst performance evaluation test results of each catalyst obtained in Examples 1 to 42 and Comparative Examples 1 to 133. As is clear from comparison of the results in Examples 1 to 42 and the results in Comparative Examples 1 to 133 illustrated in FIG. 12 and represented in Table 1 to Table 8, it was confirmed that the exhaust gas purification catalyst in each of Examples 1 to 42 exhibited excellent catalyst performance in an average aspect ratio of the high-aspect-ratio pore, ranging from 10 to 50, even in a region under a high load with a high flow rate of gas.

Figure 13:
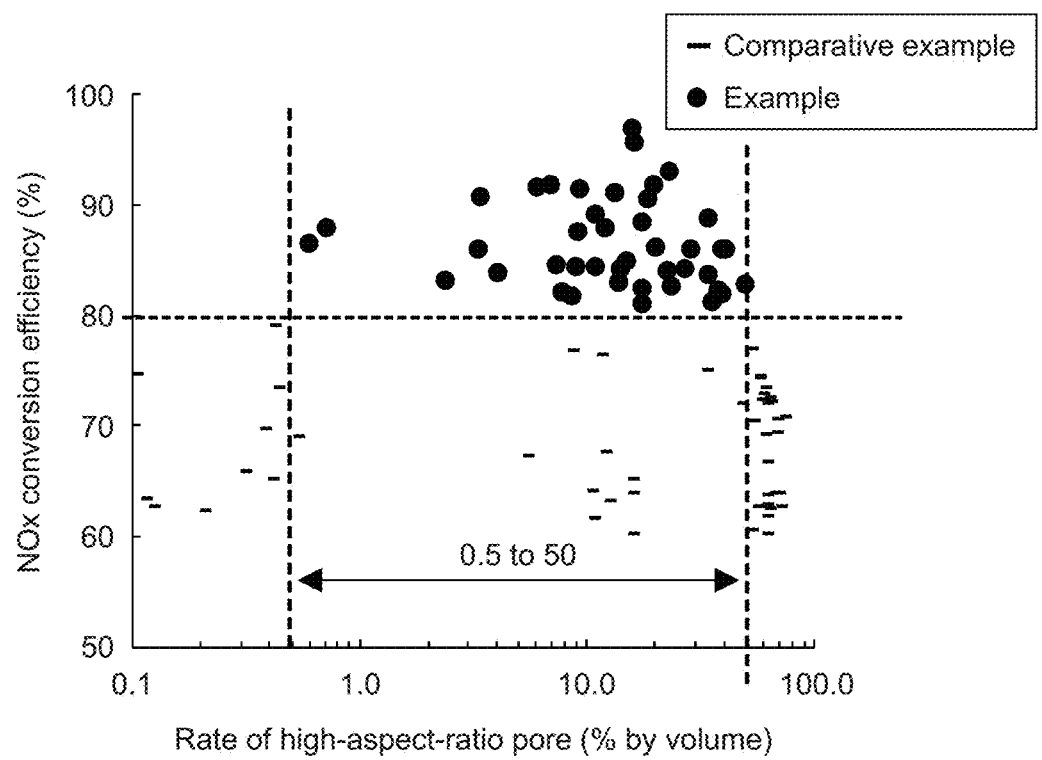
FIG. 13 is a graph representing catalyst performance evaluation test results of catalysts obtained in Examples 1 to 42 and Comparative Examples 1 to 133 of Test 1, and representing a relationship between the rate of a high-aspect-ratio pore relative to the whole of voids and the NOx conversion efficiency.

(6) Relationship Between Rate of High-Aspect-Ratio Pore Relative to Whole of Voids and Catalyst Performance FIG. 13 illustrates a graph representing a relationship between the rate of the high-aspect-ratio pore relative to the whole of a void (the rate of the high-aspect-ratio pore) and the NOx conversion efficiency, as a graph representing catalyst performance evaluation test results of each catalyst obtained in Examples 1 to 42 and Comparative Examples 1 to 133. As is clear from comparison of the results in Examples 1 to 42 and the results in Comparative Examples 1 to 133 illustrated in FIG. 13 and represented in Table 1 to Table 8, it was confirmed that the exhaust gas purification catalyst in each of Examples 1 to 42 exhibited excellent catalyst performance at a rate of the high-aspect-ratio pore relative to the whole of a void, ranging from 0.5 to 50%, even in a region under a high load with a high flow rate of gas.

Figure 14:
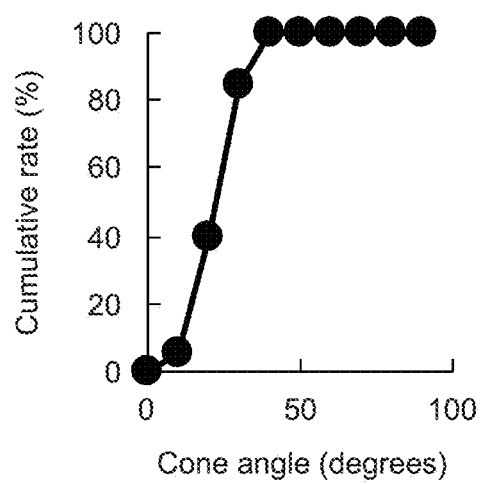
FIG. 14 is a graph representing a relationship between the cone angle and the cumulative rate of the high-aspect-ratio pore of the catalyst obtained in Example 16 of Test 1.

(7) Relationship Between 80% Cumulative Angle of High-Aspect-Ratio Pore and Catalyst Performance First, FIG. 14 illustrates a graph representing a relationship between the cone angle (degrees (°), the angle formed by vector Y in a longitudinal direction of the high-aspect-ratio pore and vector X in an exhaust gas flow direction of the substrate) and the cumulative rate (%) of the high-aspect-ratio pore of the catalyst obtained in Example 16. It was confirmed from FIG. 14 that the cone angle had a distribution.

Figure 15:
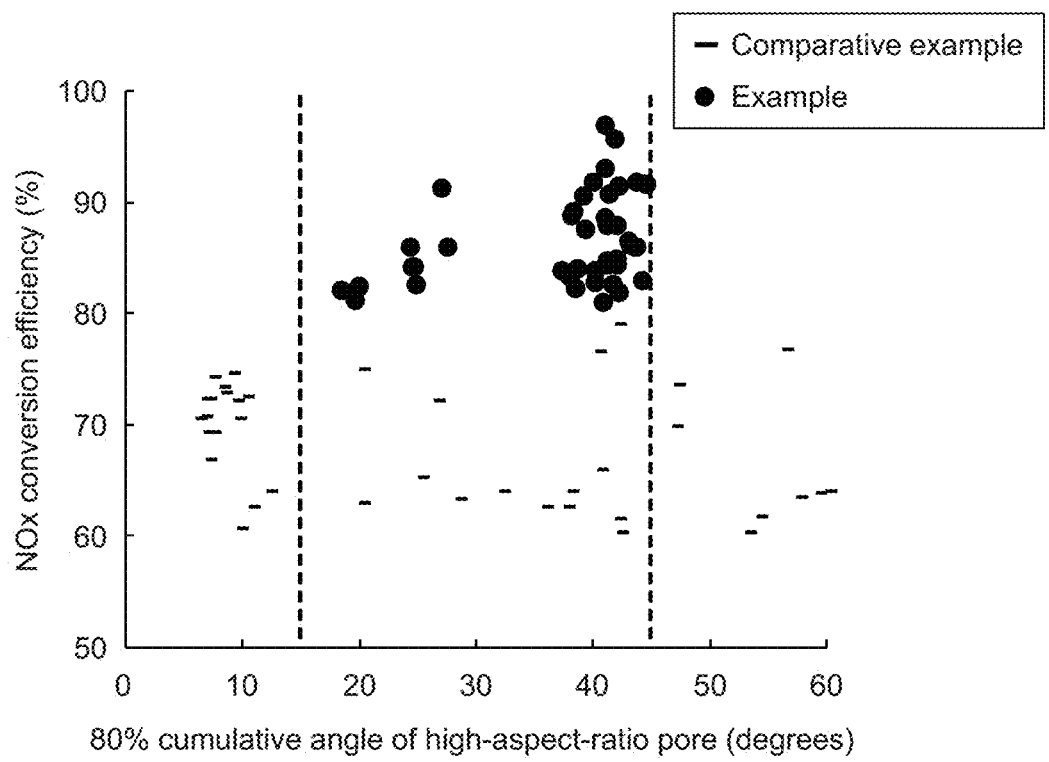
FIG. 15 is a graph representing catalyst performance evaluation test results of catalysts obtained in Examples 1 to 42 and Comparative Examples 1 to 133 of Test 1, and representing a relationship between the 80% cumulative angle of the high-aspect-ratio pore and the NOx conversion efficiency.

Next, FIG. 15 illustrates a graph representing a relationship between the 80% cumulative angle (the 80% cumulative angle in a cumulative angle distribution on an angle basis of the angle (cone angle) formed by vector Y in a longitudinal direction of the high-aspect-ratio pore and vector X in an exhaust gas flow direction of the substrate) and the NOx conversion efficiency of the high-aspect-ratio pore, as a graph representing catalyst performance evaluation test results of each catalyst obtained in Examples 1 to 42 and Comparative Examples 1 to 133. As is clear from comparison of the results in Examples 1 to 42 and the results in Comparative Examples 1 to 133 illustrated in FIG. 15 and represented in Table 1 to Table 8, it was confirmed that the exhaust gas purification catalyst in each of Examples 1 to 42 exhibited excellent catalyst performance at an orientation angle (the 80% cumulative angle on an angle basis) of the high-aspect-ratio pore, ranging from 0 to 45 degrees (°), even in a region under a high load with a high flow rate of gas.

It has been confirmed from the above results that the exhaust gas purification catalyst of the present invention is an exhaust gas purification catalyst which can exhibit excellent catalyst performance even in a region under a high load with a high flow rate of gas.

[Test 2: Preparation and Evaluation of Catalyst Having Two Catalyst Coating Layers]

1. Preparation of Catalyst (1) Comparative Example 1: Two-Layer Catalyst Prepared without Pore-Forming Material (a) Lower Pd Layer (Pd(1.0)/CZ(50)+Al$_2$O$_3$(75))

An aqueous palladium nitrate solution (produced by Cataler Corporation) having a noble metal content of 8.8% by weight was used, and a Pd/CZ material where Pd was supported on a ceria-zirconia composite oxide material (composite oxide made of 30% by weight of CeO$_2$, 60% by weight of ZrO$_2$, 5% by weight of Y$_2$O$_3$ and 5% by weight of La$_2$O$_3$: hereinafter, referred to as "CZ material") was prepared by an impregnation method. Next, the Pd/CZ material and a composite Al$_2$O$_3$ carrier containing 1% by weight of La$_2$O$_3$, and an Al$_2$O$_3$-based binder were added to and suspended in distilled water with stirring, thereby preparing slurry 1. The 15% cumulative size in a cumulative particle size distribution on a cross-sectional area of the particle included in the slurry was 3.3 μm.

Slurry 1 was allowed to flow into a cordierite honeycomb structure substrate (600H/3-9R-08, manufactured by Denso Corporation) having a volume of 875 cc, and an unnecessary content was then blown off by a blower to coat the wall surface of the substrate. The coating was formed so as to include 1.0 g/L of Pd, 75 g/L of a composite Al$_2$O$_3$ carrier and 50 g/L of a Pd/CZ material based on the volume of the substrate. After the coating was formed, the water content was removed in a dryer at 120° C. for 2 hours, and thereafter the resultant was fired in an electric furnace at 500° C. for 2 hours. The thickness of the coating based on SEM observation was 35 μm, and the porosity of the coating based on a weight-in-water method was 73%.

(b) Upper Rh Layer (Rh(0.2)/CZ(60)+Al$_2$O$_3$(40))

An aqueous rhodium hydrochloride solution (produced by Cataler Corporation) having a noble metal content of 2.8% by weight was used, and a Rh/CZ material where Rh was supported on a CZ material was prepared by an impregnation method. Next, the Rh/CZ material and a composite Al$_2$O$_3$ carrier containing 1% by weight of La$_2$O$_3$, and an Al$_2$O$_3$-based binder were added to and suspended in distilled water with stirring, thereby preparing slurry 2. The 15% cumulative size in a cumulative particle size distribution on a cross-sectional area of the particle included in the slurry was 3.2 μm.

Slurry 2 was allowed to flow into the honeycomb structure substrate coated with slurry 1, and an unnecessary content was then blown off by a blower to coat the wall surface of the substrate. The coating was formed so as to include 0.2 g/L of Rh, 40 g/L of a composite Al$_2$O$_3$ carrier and 60 g/L of a Rh/CZ material based on the volume of the substrate. After the coating was formed, the water content was removed in a dryer at 120° C. for 2 hours, and thereafter the resultant was fired in an electric furnace at 500° C. for 2 hours. The thickness of the coating based on SEM observation was 27 μm, and the porosity of the coating based on a weight-in-water method was 68%.

(2) Comparative Example 2: Two-Layer Catalyst Prepared Using Pore-Forming Material at Only Upper Layer A catalyst was prepared in the same manner as in Comparative Example 1 except that 3% by weight of a PET fiber having a diameter (φ) of 2 μm and a length (L) of 80 μm based on the weight of the metal oxide particle was further added as the pore-forming material in preparation of slurry 2. The 15% cumulative size in a cumulative particle size distribution on a cross-sectional area of the particle included in slurry 2 was 3.0 μm. In addition, in the upper layer coating formed using slurry 2 to which the pore-forming material was added, the thickness of the coating based on SEM observation was 30 μm, and the porosity of the coating based on a weight-in-water method was 70%. The volume ratio of the high-aspect-ratio pore having an aspect ratio of 5 or more to the whole of a void in the coating was 9%, and the average aspect ratio of the high-aspect-ratio pore was 40 (both were based on 3D measurement by FIB-SEM).

(3) Comparative Example 3: Two-Layer Catalyst Prepared Using Pore-Forming Material at Both Upper Layer and Lower Layer A catalyst was prepared in the same manner as in Comparative Example 1 except that 3% by weight of a PET fiber having a diameter (φ) of 2 μm and a length (L) of 80 μm based on the weight of the metal oxide particle was further added as the pore-forming material in preparation of each of slurry 1 and slurry 2. The 15% cumulative size in a cumulative particle size distribution on a cross-sectional area of the particle included in slurry 1 was 3.4 μm. In addition, in the lower layer coating formed using slurry 1 to which the pore-forming material was added, the thickness of the coating based on SEM observation was 38 μm, and the porosity of the coating based on a weight-in-water method was 75%. The volume ratio of the high-aspect-ratio pore having an aspect ratio of 5 or more to the whole of a void in the coating was 8%, and the average aspect ratio of the high-aspect-ratio pore was 41 (both were based on 3D measurement by FIB-SEM). Herein, each data of the upper layer coating formed using slurry 2 to which the pore-forming material was added was the same as (2) described above.

(4) Example 1: Two-Layer Catalyst Prepared Using Pore-Forming Material at Only Lower Layer A catalyst was prepared in the same manner as in Comparative Example 1 except that 3% by weight of a PET fiber having a diameter (φ) of 2 μm and a length (L) of 80 μm based on the weight of the metal oxide particle was further added as the pore-forming material in preparation of slurry 1. Each data of the lower layer coating formed using slurry 1 to which the pore-forming material was added was the same as (3) described above. In addition, each data of the upper layer coating formed using slurry 2 to which no pore-forming material was added was the same as (1) described above.

2. Evaluation (1) Oxygen Storage Capacity (OSC) Evaluation Under High Ga Condition Each catalyst was mounted on a 2AR-FE engine (manufactured by Toyota Motor Corporation), and A/F feedback control was performed as targets of 14.1 and 15.1 under a high intake air mass (high Ga) condition. The excess or deficiency of oxygen was calculated by the difference between the stoichiometric point and A/F sensor output from the following expression, and the maximum amount of oxygen absorption ($C_{max}$) was evaluated as the OSC.

The intake air mass was set so as to be 40 g/s or more.

$$C_{max}(g) = 0.23 \times \Delta A/F \times \text{Amount of fuel injected}$$

(2) NOx Purification Performance Evaluation Under High Ga Condition

Each catalyst was mounted on a 2AR-FE engine (manufactured by Toyota Motor Corporation). A/F was controlled so as to be stoichiometric or rich, and the NOx purification performance was evaluated under a high intake air mass (high Ga) condition. The intake air mass was set so as to be 40 g/s or more.

3. Results

Figure 16:
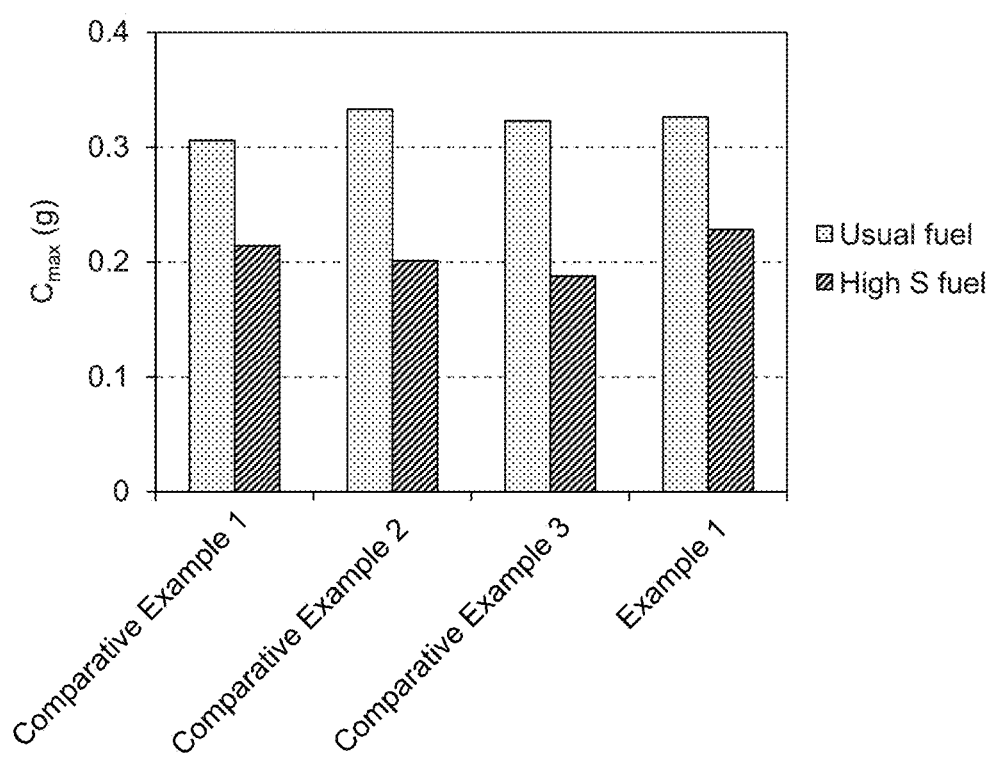
FIG. 16 is a graph representing measurement results of the maximum amount of oxygen absorption ($C_{max}$), under a high Ga condition, of the catalysts prepared in Test 2.
Figure 17:
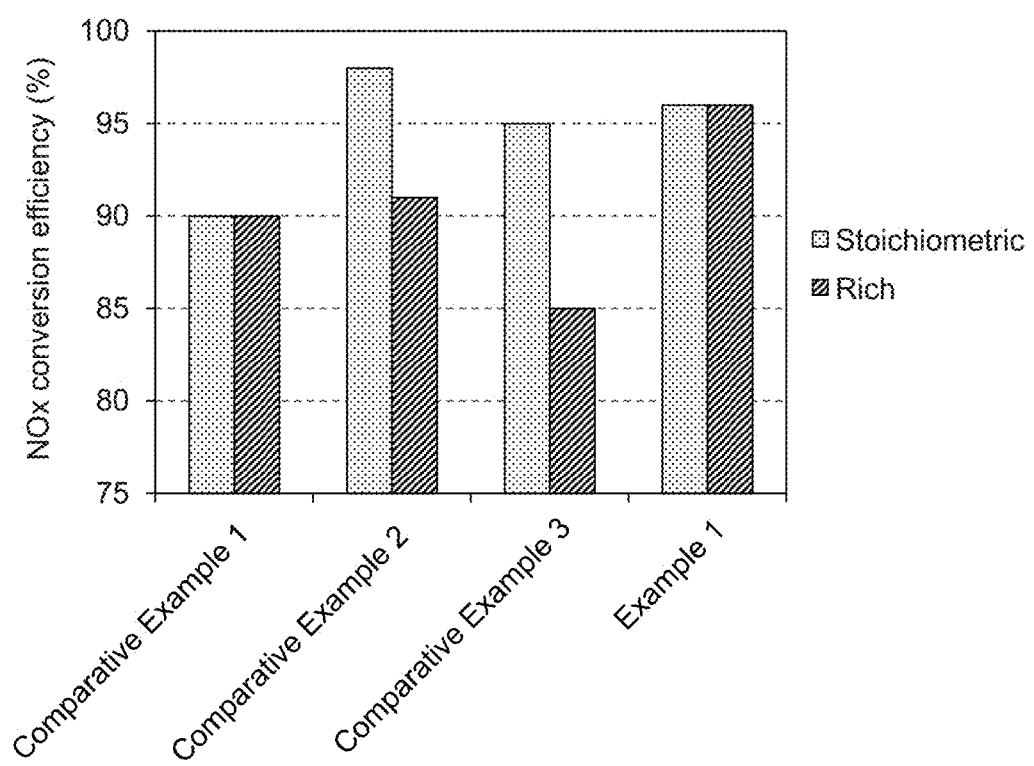
FIG. 17 is a graph representing measurement results of the NOx conversion efficiency, under a high Ga condition, of the catalysts prepared in Test 2.

FIG. 16 is a graph representing measurement results of the maximum amount of oxygen absorption ($C_{max}$) under a high Ga condition, and FIG. 17 is a graph representing measurement results of the NOx conversion efficiency under a high Ga condition. In the catalyst in Comparative Example 2, prepared by using the pore-forming material only in the upper layer, NOx purification performance at A/F stoichiometric state under a high Ga condition was superior, however, in the case of using fuel having high sulfur (S) content, the decrease in $C_{max}$ due to poisoning was remarkable, and the improvement of NOx purification performance was not much observed at A/F rich state. On the other hand, the catalyst in Example 1, prepared by using the pore-forming material only in the lower layer, was excellent in NOx purification performance both at A/F stoichiometric and rich states under a high Ga condition, and the influence of poisoning was relatively small as compared with other examples even if a fuel having a high sulfur content was used.

All documents, patents and patent publications cited in the present description are herein incorporated by reference as they are.

The invention claimed is:

1. An exhaust gas purification catalyst comprising two or more catalyst coating layers on a substrate, wherein:
    each catalyst coating layer comprises a catalyst particle having a different composition from that of an adjacent catalyst coating layer;
    in a lower catalyst coating layer that is present lower with respect to an uppermost catalyst coating layer,
        an average thickness of the coating layer is in a range from 25 μm to 160 μm,
        a porosity measured by a weight-in-water method is in a range from 50 to 80% by volume, and
        high-aspect-ratio pores having an aspect ratio of 5 or more account for 0.5 to 50% by volume of the whole volume of voids, and
    the high-aspect-ratio pore has an equivalent circle diameter of from 2 μm to 50 μm in a cross-sectional image of a catalyst coating layer cross section perpendicular to an exhaust gas flow direction and has an average aspect ratio of from 10 to 50.

2. The exhaust gas purification catalyst according to claim 1, wherein in the lower catalyst coating layer, the high-aspect-ratio pore is oriented such that an 80% cumulative angle, in a cumulative angle distribution on an angle basis, of an angle (cone angle) between a vector in a longitudinal direction of the high-aspect-ratio pore and a vector in an exhaust gas flow direction of the substrate is in a range from 0 to 45 degrees.

3. The exhaust gas purification catalyst according to claim 1, wherein a 15% cumulative size, in a cumulative particle size distribution on a cross-sectional area basis, of the catalyst particle contained in the lower catalyst coating layer is in a range from 3 μm to 10 μm.

4. The exhaust gas purification catalyst according to claim 2, wherein a 15% cumulative size, in a cumulative particle size distribution on a cross-sectional area basis, of the catalyst particle contained in the lower catalyst coating layer is in a range from 3 μm to 10 μm.

5. The exhaust gas purification catalyst according to claim 1, wherein in the lower catalyst coating layer, an amount of coating is in a range from 50 to 300 g per liter of the volume of the substrate.

6. The exhaust gas purification catalyst according to claim 2, wherein in the lower catalyst coating layer, an amount of coating is in a range from 50 to 300 g per liter of the volume of the substrate.

7. The exhaust gas purification catalyst according to claim 3, wherein in the lower catalyst coating layer, an amount of coating is in a range from 50 to 300 g per liter of the volume of the substrate.

8. The exhaust gas purification catalyst according to claim 4, wherein in the lower catalyst coating layer, an amount of coating is in a range from 50 to 300 g per liter of the volume of the substrate.

9. A method for producing an exhaust gas purification catalyst comprising two or more catalyst coating layers on a substrate, the method comprising the step of forming a lower catalyst coating layer that is present lower with respect to an uppermost catalyst coating layer using a catalyst slurry, wherein the catalyst slurry comprises:
    a noble metal particle having catalyst activity,
    a metal oxide particle having a 50% cumulative size of 3 μm to 10 μm in a cumulative particle size distribution on a volume basis, and
    a fibrous organic substance in an amount of 0.5 to 9.0 parts by mass based on 100 parts by mass of the metal oxide particle, and
    the fibrous organic substance has an average fiber diameter in a range from 1.7 μm to 8.0 μm and an average aspect ratio in a range from 9 to 40,
wherein:
    each catalyst coating layer comprises a catalyst particle having a different composition from that of an adjacent catalyst coating layer;
    in the lower catalyst coating layer that is present lower with respect to the uppermost catalyst coating layer,
    an average thickness of the coating layer is in a range from 25 μm to 160 μm,
    a porosity measured by a weight-in-water method is in a range from 50 to 80% by volume, and high-aspect-ratio pores having an aspect ratio of 5 or more account for 0.5 to 50% by volume of the whole volume of voids, and
    the high-aspect-ratio pore has an equivalent circle diameter of from 2 μm to 50 μm in a cross-sectional image of a catalyst coating layer cross section perpendicular to an exhaust gas flow direction and has an average aspect ratio of from 10 to 50.

10. The method according to claim 9, comprising the step of forming a catalyst coating by coating a surface of the substrate with the catalyst slurry such that an amount of coating of the catalyst coating layer after firing is in a range from 50 to 300 g per liter of the volume of the substrate and that an average thickness of the catalyst coating layer after firing is in a range from 25 μm to 160 μm.

11. The method according to claim 9, comprising the step of removing at least a part of the fibrous organic substance by firing after coating the surface of the substrate with the catalyst slurry.

12. The method according to claim 10, comprising the step of removing at least a part of the fibrous organic substance by firing after coating the surface of the substrate with the catalyst slurry.

* * * * *